US008291398B2

(12) United States Patent
Kawahito et al.

(10) Patent No.: US 8,291,398 B2
(45) Date of Patent: Oct. 16, 2012

(54) COMPILER FOR OPTIMIZING PROGRAM

(75) Inventors: Motohiro Kawahito, Sagamihara (JP);
Hideaki Komatsu, Yokohama (JP);
Takao Moriyama, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 12/259,746

(22) Filed: Oct. 28, 2008

(65) Prior Publication Data
US 2009/0119654 A1    May 7, 2009

(30) Foreign Application Priority Data

Oct. 30, 2007    (JP) .................................. 2007-282322

(51) Int. Cl.
*G06F 9/45* (2006.01)
*G06F 9/44* (2006.01)
(52) U.S. Cl. .......................... 717/154; 717/124; 717/141
(58) Field of Classification Search .................. None
See application file for complete search history.

(56) References Cited

U.S. PATENT DOCUMENTS

| 6,247,174 | B1 * | 6/2001 | Santhanam et al. .......... 717/154 |
| 6,961,930 | B1 * | 11/2005 | Waldspurger et al. ........ 717/141 |
| 7,373,641 | B2 | 5/2008 | Ogasawara |
| 7,945,898 | B1 * | 5/2011 | Episkopos et al. ............ 717/124 |
| 2003/0188299 | A1 * | 10/2003 | Broughton et al. ........... 717/141 |
| 2004/0163079 | A1 * | 8/2004 | Noy et al. ..................... 717/154 |
| 2004/0181781 | A1 * | 9/2004 | Tohdo et al. .................. 717/124 |
| 2005/0166195 | A1 * | 7/2005 | Kawahito ...................... 717/154 |
| 2005/0273775 | A1 * | 12/2005 | Brookes et al. ............... 717/141 |
| 2006/0129992 | A1 * | 6/2006 | Oberholtzer et al. ......... 717/124 |
| 2008/0127148 | A1 * | 5/2008 | Moudgill et al. ............. 717/154 |

OTHER PUBLICATIONS

John Gough, Eliminating Range Checks using Static Single Assignment Form, Queensland University of Technology Herbert Kalaeren, University or Tubingen, 1994, pp. 3-13.*
Roberto Cipolla, Part IA Computing Course Tutorial Guide to C++ Programming, Department of Engineering University of Cambridge, 2004, pp. 15-20.*
William H. Harrison, Compiler Analysis of the Value Ranges for Variables, IEEE Transactions on Software Engineering, 1977, pp. 243-249.*
Harrison, "Compiler Analysis of the Value Ranges for Variables", IEEE Transactions on Software Engineering, vol. SE-3, No. 3, May 1977, pp. 243-250.
Kawahito, et al, "A New Idiom Recognition Framework for Exploiting Hardware-Assist Instructions", ASPLOS '06, Oct. 2006, pp. 382-393.

* cited by examiner

*Primary Examiner* — Thuy Dao
*Assistant Examiner* — Mongbao Nguyen
(74) *Attorney, Agent, or Firm* — William Stock; Anne Vachon Dougherty

(57) ABSTRACT

A compiler system and method for calculating a value to be assigned to a variable for optimizing a program. The apparatus includes a subrange analysis unit for analyzing, for an instruction to assign a value to a variable in the program, a range of the value being assignable to the variable by the instruction, as a subrange of the variable in a case where instruction is executed; a determination unit for determining if the execution result of the program changes if the instruction assigns any value in the subrange of the variable to the variable on the basis of the analyzed subrange of the variable; and a replacement unit for replacing the instruction to assign the value to the variable with an instruction to assign a constant value in the subrange of the variable to the variable.

14 Claims, 20 Drawing Sheets

```
                                                              ,26C
  ┌─────────────────────────────────────────────────────────────┐
  │ 1:READ NUMBER len OF ELEMENTS FROM EACH OF ARRAY VARIABLES src1 │
  │   AND src2 BY USE OF CLC INSTRUCTION, AND COMPARE READ ELEMENTS │
  │ 2: if (CC FLAG==0) {                                          │
  │ 3:     diff=0;                                                │
  │ 4: } else {                                                   │
  │ 5:     diff=1;                                                │
  │ 6: }                                                          │
  │ 7: if(diff==0) {                                              │
  │ 8:     /*PROCESSING 1*/                                       │
  │ 9: } else {                                                   │
  │ 10:    /*PROCESSING 2*/                                       │
  │ 11: }                                                         │
  └─────────────────────────────────────────────────────────────┘
```

FIG. 18

```
         ,20D                                    ,22D
  ┌────────────────────────┐         ┌────────────────────────┐
  │ 1:  diff=methodC() :   │◄────────│ 1: methodC() {         │
  │ 2:                     │         │ 2:    while(i<len) {   │
  │ 3: if(diff==0) {       │         │ 3:       int diff=src1[i]-src2[i]; │
  │ 4:    /*PROCESSING 1*/ │         │ 4:       if (diff!=0) break; │
  │ 5: else if (diff>0) {  │         │ 5:    }                │
  │ 6:    /*PROCESSING 2*/}│         │ 6:    return diff;}    │
  │ 7: } else {            │◄────────│ 7: }                   │
  │ 8:    /*PROCESSING 3*/}│         │                        │
  │ 9: }                   │         │                        │
  └────────────────────────┘         └────────────────────────┘
```

FIG. 19

```
                                                            24D
    1: while (i<len) {
    2:     int diff=src1[i]-src2[i] ;
    3:     if (diff!=0) break ;
    4: }
    5: if (diff==0) {
    6:     /*PROCESSING 1*/
    7: } else if(diff>0) {
    8:     /*PROCESSING 2*/
    9: } else {
    10:    /*PROCESSING 3*/
    11: }
```

FIG. 20

```
                                                            26D
    1:READ NUMBER len OF ELEMENTS FROM EACH OF ARRAY VARIABLES src1
      AND src2 BY USE OF CLC INSTRUCTION, AND COMPARE READ ELEMENTS
    2: if (CC FLAG==0) {
    3:     diff=0;
    4: } else if (CC FLAG==1) {
    5:     diff=-1;
    6: } else {
    7:     diff=2 ;
    8: }
    9: if (diff==0) {
    10:    /*PROCESSING 1*/
    11:    else if (diff>0) {
    12:    /*PROCESSING 2*/
    13: } else {
    14:    /*PROCESSING 3*/
    15: }
```

FIG. 21

```
                                    ┌ 26C
1: READ NUMBER len OF ELEMENTS FROM EACH OF ARRAY VARIABLES src1
   AND src2 BY USE OF CLC INSTRUCTION, AND COMPARE READ ELEMENTS
2: if (CC FLAG==0) {
3:   /*PROCESSING 1*/
4: } else {
5:   /*PROCESSING 2*/}
6: }
```

FIG. 23

```
1: IPM   R1       // CC IS STORED IN SECOND AND THIRD BIT PORTIONS OF R1 (0 FOR ZERO AND FIRST BITS)
2: SLL   R1, 2    // 2-BIT SHIFT LEFT
3: SRA   R1, 30   // 30-BIT ARITHMETIC SHIFT RIGHT
4: LCR   R1, R1   // R1 = -R1
```

FIG. 24

```
1: READ NUMBER len OF ELEMENTS FROM EACH ARRAY VARIABLES src1
   AND src2 BY USE OF CLC INSTRUCTION, AND COMPARE READ ELEMENTS
2: if (CC FLAG==0) {
3:     diff=0;
4: } else if (CC FLAG==1) {
5:     diff=1;
6: } else {
7:     diff=2 ;
8: }
9: if (diff==0) {
10:    /*PROCESSING 1*/
11: } else if (diff==2) {
12:    /*PROCESSING 2*/
13: } else {
14:    /*PROCESSING 3*/
15: }
```

```
1: IPM    R1        //CC IS STORED IN SECOND AND THRID BIT PORTIONS OF R1 (0 FOR ZERO AND FIRST BITS)
2: SRA    R1, 28    // 28-BIT ARITHMETIC SHIFT RIGHT
```

FIG. 25(b)

```
                                              26E
    1: if (PREDETERMINED CONDITION) {
    2:    Nullcheck a;
    3:    for (i=0: i<a. length: i++) {
    4:       if (a[i]>=0x80)break ;
    5:    }
    6:    answer=0 ;
    7: } else {
    8:    answer=-1 ;
    9: }
   10:    if (answer==-1) {
   11:    /*PREDETERMINED PROCESSING*/
   12: }
```

FIG. 28

```
                                              28E
    1: if (PREDETERMINED CONDITION) {
    2:    Nullcheck a;
    3:    ~~for (i=0: i<a. length: i++) {~~
    4:       ~~if (a[i]>=0x80)break ;~~
    5:    ~~}~~
    6:    answer=0 ;
    7: } else {
    8:    answer=-1 ;
    9: }
   10:    if (answer==-1) {
   11:    /*PREDETERMINED PROCESSING*/
   12: }
```

FIG. 29

COMPILER FOR OPTIMIZING PROGRAM

BACKGROUND OF THE INVENTION

The present invention relates to a compiler for optimizing a program. In particular, the present invention relates to a compiler for optimizing an instruction to assign a value to a variable.

A programming language processor or an operating system includes a group of programs in which frequently used functions are gathered together. Such a program is termed as a library program. A library program starts to operate when called by a user program, and then returns the execution result as a return value to the user program.

The indexOf method of String class written in the Java (registered trademark) language, for example, searches a character string specified as an argument for a character specified as an argument, and then returns the index of the character (a numeric value indicating where the character is from the top of the character string, for example). When the character is not searched out, the indexOf method returns the numeric value −1 indicating that the character is not searched out.

Moreover, as another example, a method that generates an object satisfying a condition specified as an argument returns the pointer of the object in a case where the method succeeds in generating the object. On the other hand, if the method fails to generate the object, the method returns a constant NULL indicating that the generation of the object failed.

As described in the above examples, a return value has multiple properties in some cases. Specifically, the return value indicates not only the processing result such as an index, a pointer or the like, but also the success or failure of the processing by use of a specific numeric value such as −1 or NULL.

Incidentally, Japanese Patent Application Laid-open Publication No. 2003-196106 is a reference for various types of optimization methods as to an assignment instruction.

A returned numeric value is assigned to a variable, and then is to be referenced in processing thereafter. In a user program, for example, the variable is compared with a constant. Moreover, the variable may be used in an arithmetic operation. In some user programs, however, the variable is compared only with a specific constant value such as −1 or NULL, and is not used in a comparison with another variable or in an arithmetic operation. In this case, the processing to find a specific numeric value to be assigned to the variable, the value being, for example, an index or a pointer to an object, results in being useless.

SUMMARY OF THE INVENTION

In order to solve the aforementioned problems, a first aspect of the present invention is to provide a compiler apparatus that optimizes a program, the compiler apparatus including a subrange analysis unit, a determination unit and a replacement unit. Specifically, the analysis unit analyzes, for an instruction to assign a value to a variable in the program, a range of the value being assignable to the variable by the instruction, as a subrange of the variable if the instruction is executed. The determination unit determines, on the basis of the analyzed subrange of the variable, if the execution result of the program changes with an assignment, by the instruction, of any value within the subrange of the variable to the variable. Moreover, the replacement unit replaces, under the condition that the determination made by the determination unit is true, the instruction to assign a value to the variable with an instruction to assign a constant value in the subrange of the variable to the variable. In addition, a compiler program causing a computer to function as the compiler apparatus, and a compiling method for optimizing a program by the compiler apparatus are provided.

It should be noted that the aforementioned summary of the present invention does not list all of the essential aspects of the present invention. A sub combination possible to be obtained from these aspect groups can also be the invention.

BRIEF DESCRIPTION OF THE DRAWINGS

For a more complete understanding of the present invention and the advantages thereof, reference is now made to the following description taken in conjunction with the accompanying drawings.

FIG. 18 shows a specific example of an intermediate program 26C according to the embodiment.

FIG. 19 shows specific examples of an input program 20D and a library program 22D according to the embodiment.

FIG. 20 shows a specific example of an intermediate program 24D according to the embodiment.

FIG. 21 shows a specific example of an intermediate program 26D according to the embodiment.

FIG. 23 shows another specific example of the intermediate program 26C according to the embodiment.

FIG. 24 shows examples of execution codes corresponding instructions in lines 2 to 8 of the intermediate program 26D according to the embodiment.

FIG. 25A shows another specific example of the intermediate program 26D according to the embodiment.

FIG. 25B shows examples of execution codes corresponding instructions in lines 2 to 8 of the intermediate program 26D according to the embodiment.

FIG. 28 shows a specific example of an intermediate program 26E according to the embodiment.

FIG. 29 shows a specific example of an intermediate program 26F according to the embodiment.

DETAILED DESCRIPTION OF THE INVENTION

Hereinafter, the present invention will be described by using a preferred mode for carrying out the present invention (referred to as an embodiment). The following embodiment, however, does not limit the present invention recited in the scope of claims, and all combinations of the features described in the embodiment are not necessarily essential for solving means of the present invention.

Figure 1:
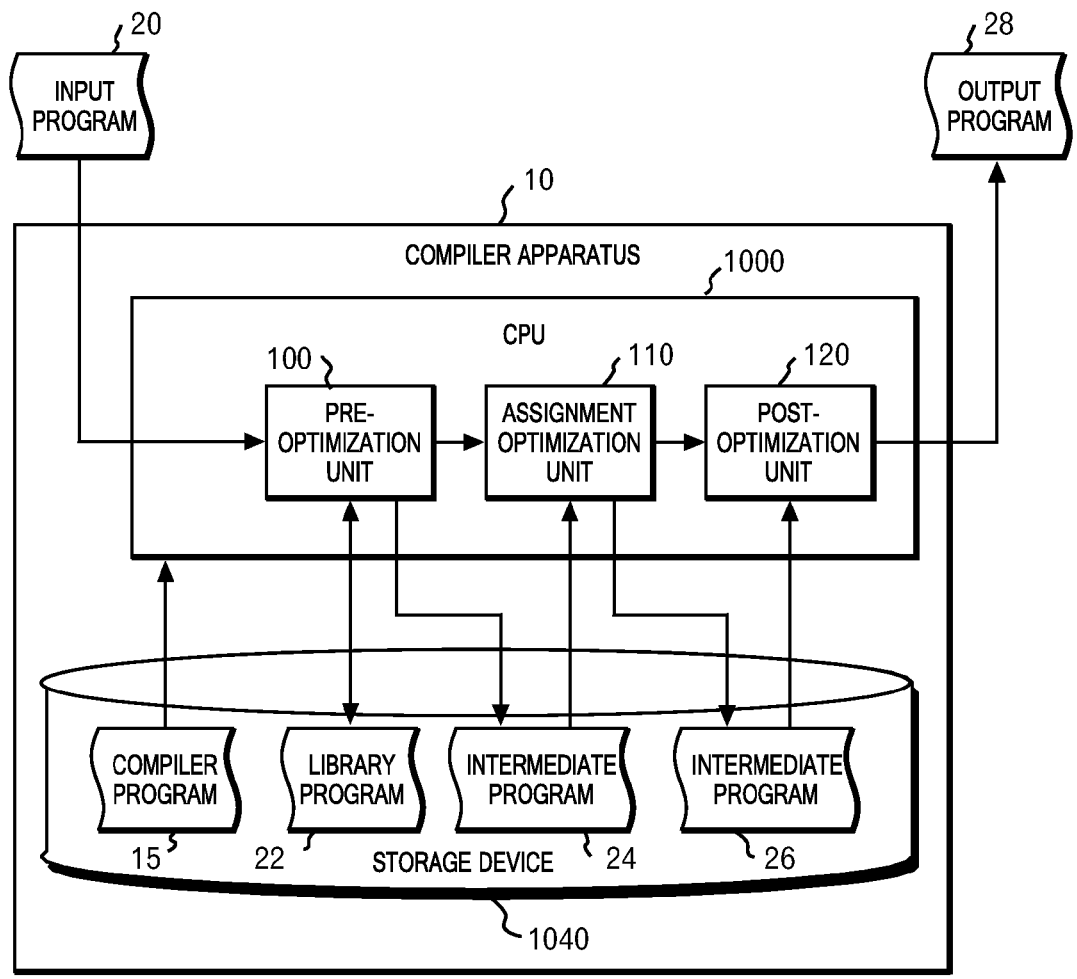
FIG. 1 shows an entire configuration of a compiler apparatus 10 according to an embodiment.

FIG. 1 shows an entire configuration of a compiler apparatus 10 according to the present embodiment. The compiler 10 is implemented by a computer that reads and executes programs. Specifically, the compiler apparatus 10 is provided with a central processing unit (CPU) 1000 and a storage device 1040, as the basic hardware. The CPU 1000 loads a compiler program 15 from the storage device 1040, and then execute the compiler program 15, so that the computer functions as the compiler apparatus 10.

The compiler apparatus 10 compiles an input program 20 written in a high-level programming language such as the Java (registered trademark) language, for example. Then, the compiler apparatus 10 generates an execution code executable by a computer, and outputs the execution code. The execution code may be an execution code executable by a computer with System z architecture or System p architecture provided by International Business Machines (IBM) Corporation, for example. This execution code is termed as an output program 28.

As specific examples of compile functions, the compiler apparatus 10 functions as a pre-optimization unit 100, an assignment optimization unit 110 and a post-optimization unit 120 by causing the CPU 1000 to execute the compiler program 15. The pre-optimization unit 100 selects a portion required for the execution of the input program 20, from a library program 22 previously stored in the storage device 1040. Then, the pre-optimization unit 100 optimizes a program obtained by combining the selected portion and the input program 20.

The pre-optimization unit 100 may perform so-called front-end compile processing such as a lexical analysis, a syntax analysis of the input program 20. In addition to this, the pre-optimization unit 100 may also perform an optimization such as a method inlining or an analysis between methods, for example. The optimized program is stored in the storage device 1040, as an intermediate program 24.

The assignment optimization unit 110 reads the intermediate program 24 by accessing the storage device 1040, and then optimizes an instruction that assigns a value to a variable, and that is included in the read intermediate program 24. By scanning the intermediate program 24, the assignment optimization unit 110, for example, may analyze, by use of a technique such as a dataflow analysis, for example, subranges of variables at the time of executing instructions in the intermediate program 24. As an example, the assignment optimization unit 110 analyzes, as a subrange of a variable, the range of values within which a certain assignment instruction can assign a value to a variable.

The assignment optimization unit 110 optimizes the assignment instruction by use of the result of the analysis. The assignment optimization unit 110, for example, determines if the execution result of the output program 28 changes from the original meaning of the input program 20 even in a case where any value within the subrange of the variable is assigned to the variable. If it is determined that execution result does not change, the assignment optimization unit 110 replaces the assignment instruction with an instruction that assigns a predetermined constant value representing the subrange of the variable. Thereby, processing for generating a value to be assigned, for example, processing for calculating a value by an operation can be made unnecessary.

The optimized program is stored as an intermediate program 26 in the storage device 1040. Subsequently, the post-optimization unit 120 performs various types of optimizations for the intermediate program 26. The post-optimization unit 120 performs optimizations that are made possible secondarily as a result of the optimization of the aforementioned assignment instruction. In a case where the processing for calculating a value by an arithmetic operation becomes no longer necessary, for example, a different variable to be used in the arithmetic operation is no longer used in some cases as the result of the processing being made unnecessary. In such a case, the post-optimization unit 120 can delete processing for calculating the value of the different variable.

In addition, the post-optimization unit 120 may perform so-called backend compile processing such as processing for replacing the optimized program with a specific machine language. The compiled program is outputted as the output program 28 to the outside of the compiler apparatus 10.

As described above, through the optimization of an assignment instruction, the compiler apparatus 10 according to the present embodiment makes the processing for generating a value to be assigned no longer necessary. Furthermore, the compiler apparatus 10 can additionally perform various types of optimizations that are made possible as a result of making the processing for generating a value to be assigned no longer necessary. Hereinafter, a more detailed description will be provided.

To begin with, a first example of the optimization of an assignment instruction will be described with reference to FIGS. 2 to 4. In this example, the input program 20, the library program 22, the intermediate program 24 and the intermediate program 26 are assumed to be an input program 20A, a library program 22A, an intermediate program 24A and an intermediate program 26A, respectively.

Figure 2:
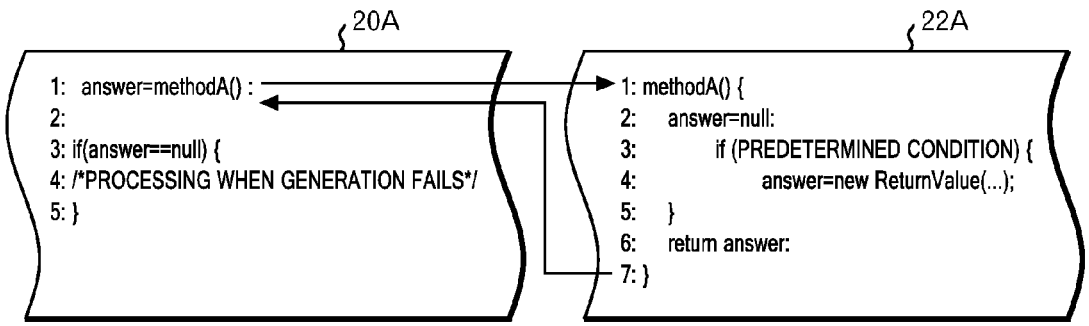
FIG. 2 shows specific examples of an input program 20A and a library program 22A according to the embodiment.

FIG. 2 shows specific examples of the input program 20A and the library program 22A according to the present embodiment. The input program 20A includes, in line 1, an instruction to call a method named methodA and then to assign the return value to a variable termed as answer. Moreover, the input program 20A includes, in lines 3 to 5, an instruction to perform predetermined processing due to a failure in generating an object if the value of the variable answer is equal to the null pointer.

On the other hand, the library program 22A includes the definition of methodA in lines 1 to 7. Specifically, the library program 22A includes, in line 2, processing for assigning a null pointer to the variable answer. Moreover, the library program 22A includes, in lines 3 to 5, processing for generating a new object in a case where a predetermined condition is satisfied and then for assigning the pointer to the variable answer. In addition, the library program 22A includes, in line 6, an instruction to return the value of the variable answer as the return value.

The pre-optimization unit 100 generates the intermediate program 24A by inlining this methodA.

Figure 3:
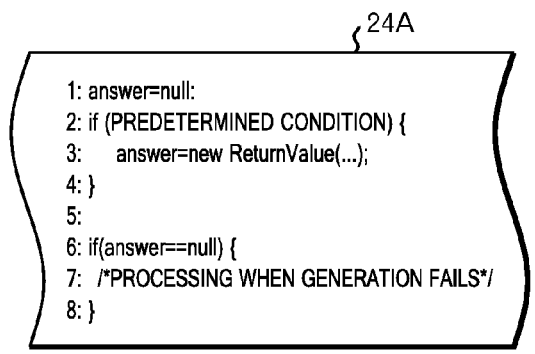
FIG. 3 shows a specific example of an intermediate program 24A according to the embodiment.

FIG. 3 shows a specific example of the intermediate program 24A according to the present embodiment. The instructions in methodA are expanded in lines 1 to 4 without being modified except for an instruction to return a return value.

In reference with this intermediate program 24A, the variable answer to which a value is assigned in line 1 or 3 is referenced by only the conditional branch instruction in line 6, after line 1 or 3. Then, the conditional branch instruction simply compares the variable answer with the null pointer. Then, as shown in this example, when inline expansion is performed for a method, there is often a case where the same program includes both an assignment and reference of a variable.

In this intermediate program 24A, in a case where the variable answer is simply compared with a constant value and is not used for a different purpose, the specific processing for generating a value to be assigned to the variable answer, that is, for example, the processing for generating an object here becomes useless. The assignment optimization unit 110 replaces such assignment instruction with an instruction that simply assigns a constant value to the variable. A program in which the assignment instruction is replaced with such instruction is shown as the intermediate program 26A in FIG. 4.

Figure 4:
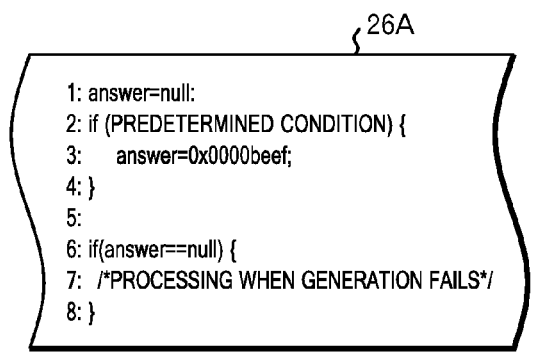
FIG. 4 shows a specific example of an intermediate program 26A according to the embodiment.

FIG. 4 shows a specific example of the intermediate program 26A according to the present embodiment. The assignment instruction included in line 3 of the intermediate program 24A is replaced with the instruction to assign a constant 0x0000beef to the variable in the intermediate program 26A. Although the assignment instruction is replaced in this manner, the execution result of the intermediate program 26A is the same as the result of the execution result of the intermediate program 24A since the variable answer is used for only a comparison with null.

As described in the first example, according to the compiler apparatus 10, various types of processing involved with the generation of an object such as allocation and initialization of a storage area can be omitted. Thereby, the program can be efficiently executed.

Next, a second example of the optimization of an assignment instruction will be described with reference to FIGS. 5 to 7.

Figure 5:
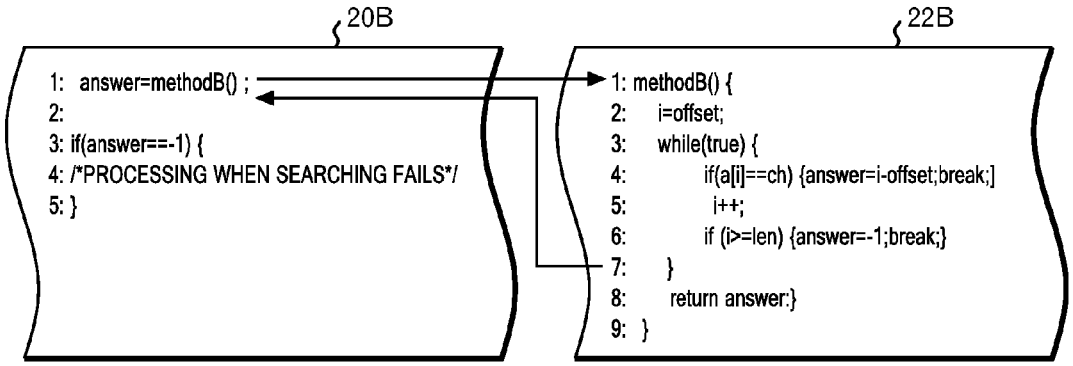
FIG. 5 shows specific examples of an input program 20B and a library program 22B according to the embodiment.

FIG. 5 shows a specific example of an input program 20B and a library program 22B according to the present embodiment. The input program 20B includes, in line 1, an instruction to call a method named methodB and then to assign the return value to a variable called answer. In addition, if the value of the variable answer is equal to a constant value that is an integer −1, this means that searching for a character has failed. In this case, the input program 20A includes, in lines 3 to 5, an instruction to perform predetermined processing.

On the other hand, the library program 22B includes the definition of methodB in lines 1 to 9. This methodB shows a part of indexOf method defined in String class of the Java (registered trademark) language.

Specifically, the library program 22B includes, in line 2, processing for initializing a variable i with the value of a variable offset. In addition, the library program 22B includes, in lines 3 to 7, an instruction set that sequentially compares each element of an array variable a with a variable ch. The library program 22B includes, in line 4, an instruction to assign the difference between the variable i and variable offset to the variable answer, for example, if the i-th element of the array variable a is equal to the predetermined variable ch.

Moreover, the library program 22B includes, in line 6, an instruction to assign the numeric value −1 to the variable answer if an element equal to the variable ch is not searched out by scanning the number of elements of the array variable a, the number being equal to the value of the variable len. The library program 22B also includes, in line 8, the instruction to return the value of the variable answer as a return value.

The pre-optimization unit 100 generates the intermediate program 24B by performing inline expansion for this methodB.

Figure 6:
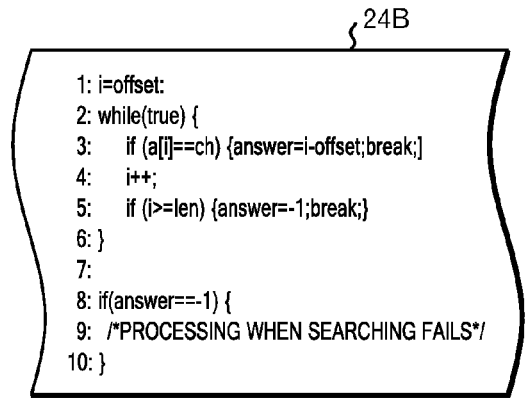
FIG. 6 shows a specific example of an intermediate program 24B according to the embodiment.

FIG. 6 shows a specific example of the intermediate program 24B according to the present embodiment. The instructions within methodB are expanded in lines 1 to 6 without being modified except for an instruction to return a return value.

In reference with this intermediate program 24B, the variable answer to which a value is assigned in line 3 or 5 is referenced by only the conditional branch instruction in line 8, after line 3 or 5. Then, the conditional branch instruction simply compares the variable answer with the constant −1. As described above, the same program thus includes both an assignment and reference of a variable by performing inline expansion for the method in this example as well.

In this intermediate program 24B, in a case where the variable answer is simply compared with a constant value and is not used for a different purpose, the specific processing for generating a value to be assigned to the variable answer, that is, for example, arithmetic operation in line 3 for subtracting the value of the variable offset from the variable i becomes useless. The assignment optimization unit 110 replaces such assignment instruction with an instruction that simply assigns a constant value to the variable. The program in which the assignment instruction is replaced with such instruction is shown as the intermediate program 26B in FIG. 7.

Figure 7:
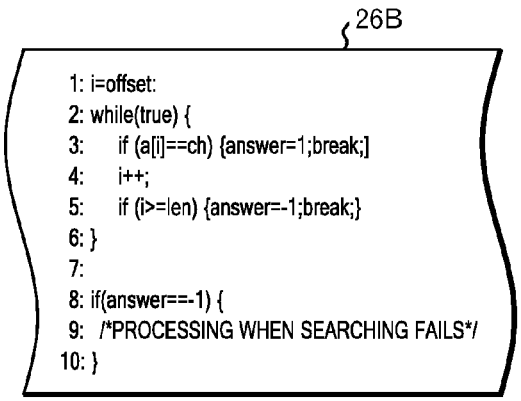
FIG. 7 shows a specific example of an intermediate program 26B according to the embodiment.

FIG. 7 shows a specific example of the intermediate program 26B according to the present embodiment. The assignment instruction included in line 3 of the intermediate program 24B is replaced with an instruction to assign an integer 1, which is a constant value, to the variable in the intermediate program 26B. Although the assignment instruction is replaced in this manner, the execution result of the intermediate program 26B is the same as the execution result of the intermediate program 24B since the variable answer is used for only a comparison with the constant value −1. As a result, the arithmetic processing can be omitted in the intermediate program 26B in comparison with the intermediate program 24B.

This optimization described as the second example is particularly effective in a case where a program is intended to be executed in a specific architecture. System p provided by IBM Corporation, or the like, for example, includes a machine language instruction to determine, at an extremely high speed, if a specific element value is included in the eight elements of an array variable. This machine language instruction, however, cannot determine where the element value is positioned in the array variable.

In line 3 of the intermediate program 24B, if an element equal to a specific element value ch is searched out, a calculation is performed to find where the element is positioned in the array variable a, and then, the value is assigned to the variable answer. For this reason, it is difficult for the post-optimization unit 120 to replace the intermediate program 24B with an execution code using the aforementioned machine language instruction.

On the other hand, in line 3 of the intermediate program 26B, if an element equal to the specific element value ch is searched out, only the specific constant value 1 is assigned to the variable answer. Accordingly, the post-optimization unit 120 can replace the intermediate program 26B with the execution code that uses the aforementioned machine program language and that can be executed at an extremely high speed.

As described above, according to the assignment optimization unit 110 according to the present embodiment, not only can an arithmetic processing for calculating a value be deleted, but also an opportunity for a different optimization is increased as a result of deleting the arithmetic processing.

Next, a description will be given of a function of optimizing an assignment instruction in further details.

Figure 8:
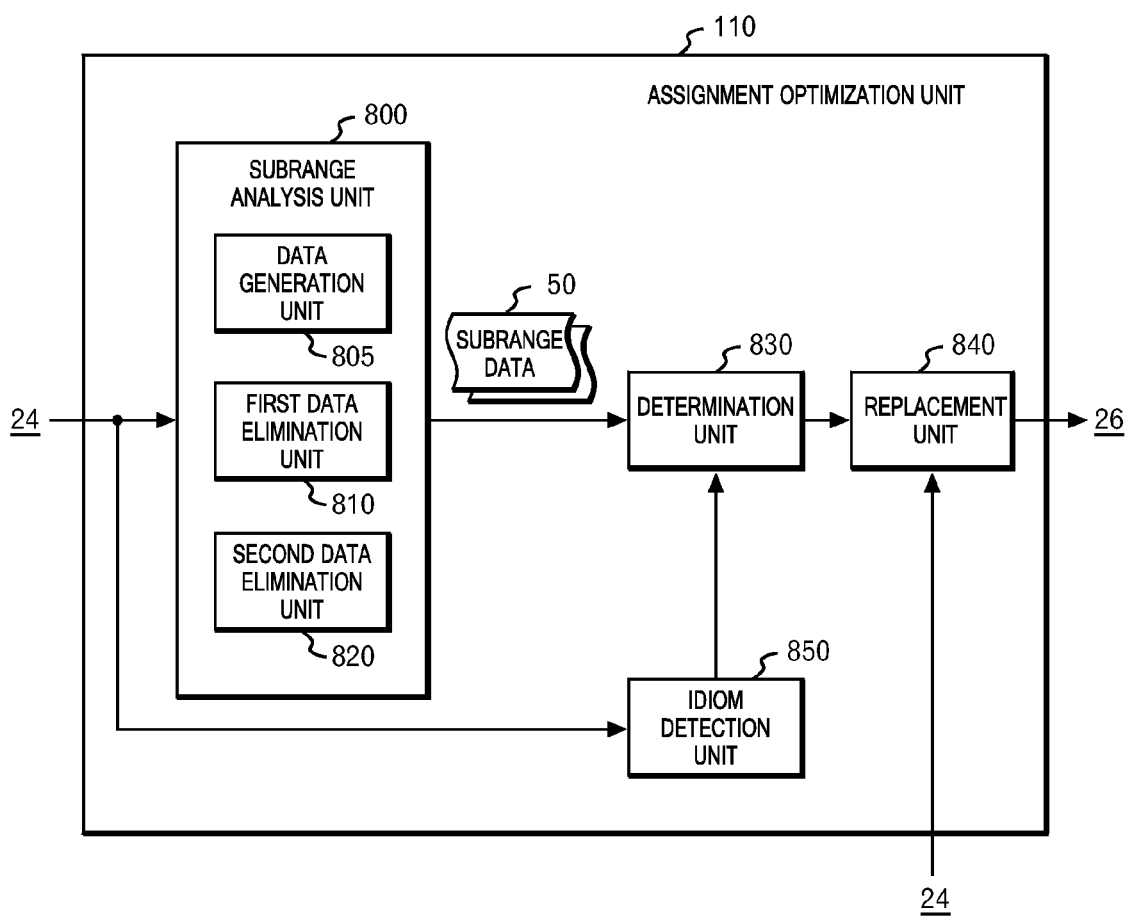
FIG. 8 shows a functional configuration of an assignment optimization unit 110 according to the embodiment.

FIG. 8 shows a functional configuration of the assignment optimization unit 110 according to the present embodiment. The assignment optimization unit 110 is provided with a subrange analysis unit 800, a determination unit 830, a replacement unit 840 and an idiom detection unit 850. The subrange analysis unit 800 reads the intermediate program 24 by accessing the storage device 1040. Then, as to an instruction to assign a value to a variable in the intermediate program 24, the subrange analysis unit 800 analyzes, as the subrange of the variable in a case where the instruction is executed, the range of values within which the instruction can assign a value.

For example, it is found from the analysis that, in a case where a certain instruction assigns the pointer of an object to a variable as shown in line 3 of the intermediate program 24A of FIG. 3, the value to be assigned to the variable is in a range outside the null pointer. In addition, the variable i is firstly initialized with the value of the variable offset and is incremented sequentially thereafter, according to lines 1 and 4 of the intermediate program 24B of FIG. 6. Accordingly, it is found that the value of the variable i is equal to or greater than the value of the variable offset. As a result, it is found from the analysis that the value (i-offset) to be assigned to the variable answer in line 3 is in a range not less than 0.

In addition, for instructions each referencing the variable in the intermediate program 24, the subrange analysis unit 800 analyzes the subrange of the variable in a case where the corresponding instruction is executed. As to an instruction that conditionally branches on the basis of the value of the variable, the subrange analysis unit 800 may associate subranges of the variable with the corresponding instructions resulting from the conditional branch, and then analyze the subranges of the variable in the respective branch destinations. For example, as in line 6 of the intermediate program 24A of FIG. 3, as to the instruction that conditionally branches in comparison of the variable with a constant, it is found from the analysis by the subrange analysis unit 800 that the subrange of the variable in one branch destination is "all range except null," and that the subrange of the variable in the other branch destination is "null." The result of the analysis may be stored as subrange data 50 in the storage device 1040, or may be outputted to the determination unit 830.

To carry out the analysis described above, a technique for a value range analysis of a variable value is utilized (refer to W. Harrison, "Compiler Analysis of the Value Ranges for Variables" In IEEE Transactions on Software Engineering, Vol. 3, No. 3, pp. 243-250, 1977, for example). This technique is known in the applicable technical field, and an overview of the technique is as follows. First, the subrange analysis unit 800 divides the intermediate program 24 into a plurality of basic blocks. Then, the subrange analysis unit 800 detects an instruction used in the determination of the variable value range for each of the basic blocks. Then, the subrange analysis unit 800 determines a variable value range for each of the basic blocks on the basis of the detected instruction.

In a case where a conditional branch instruction having a condition that a variable a is greater than a constant 0 is detected, for example, the subrange analysis unit 800 determines that the range of the value of the variable a is a positive integer in the branch destination of the basis block. Moreover, if a reference instruction of an array variable having a variable as its suffix is detected in a case where it is defined by the specification of the programming language that the suffix of an array variable is a positive number, the subrange analysis unit 800 determines that the range of the value of the variable of the suffix is a positive number. In a case where the range of the variable is not defined, that is, for example, a case where the result of an arithmetic operation is to be assigned to the variable, the range of the value of the variable is determined to be all range.

Then, the subrange analysis unit 800 causes the information on the analyzed range to be sequentially propagated to other basic blocks in the execution direction of the program. For example, in a case where the value range of a certain variable a in the first basic block is determined to be a positive number, the value of the variable a in the second basic block to be executed after the first basic block is also a positive number. Moreover, in a case where the last part of the first basic block is a conditional branch instruction and where any one of the second and third basic blocks is to be executed next, the value of the variable a in each of the second and third basic blocks is also a positive number.

In a case where the conditional branch instruction branches on the basis of the value of the variable a, it is not limited to this, however. For example, in a case where the second basic block is executed if the value of the variable a is greater than a constant 10, and where the third basic block is executed otherwise, the value of the variable a in the second basic block is greater than the constant 10. On the other hand, the value of the variable a in the third basic block is greater than 0 but not greater than 10.

The subrange analysis unit 800 repeats the propagation of the value range of the variable described above until the value range of the variable no longer changes.

Such results of the analyses are preferably arranged and managed in a predetermined data structure in order for the results of the analyses to be efficiently referable in the later processing. In addition, there is a case where a part of the results of these analyses becomes no longer necessary in terms of making the later processing efficient. In order to achieve such purposes, the subrange analysis unit 800 is provided with a data generation unit 805, a first data elimination unit 810 and a second data elimination unit 820. The processing to be performed by each of these units will be described later in detail.

Next, descriptions will be given of the determination unit 830, the replacement unit 840 and the idiom detection unit 850. The determination unit 830 determines, on the basis of the subrange of a variable analyzed by the subrange analysis unit 800, if the execution result of the intermediate program 24 changes if the assignment instruction assigns any value within the subrange of the variable to the variable.

Specifically, the determination unit 830 determines if the subrange of the variable for a certain instruction to assign the value of the variable is included in the subrange of the variable in any one of the branch destinations of an instruction that conditionally branches on the basis of the assigned value of the variable, and also if the subrange of the variable overlaps with a subrange of the variable in any other branch destinations and a subrange of the variable for any other instructions that reference to the variable.

The intermediate program 24A of FIG. 3, for example, includes, in line 3, an instruction to assign a pointer to an object to the variable answer. The subrange of this variable answer is other than null according to the result of the aforementioned analysis. In the meantime, the intermediate program 24A of FIG. 3 includes, in line 6, a conditional branch instruction that compares the variable answer with a constant null. The subrange of the variable answer in one of the branch destinations of this conditional branch instruction is other than null, and the subrange of the variable answer in the other branch destination is only null.

In this example, the subrange of the variable answer in the assignment instruction includes the subrange of the variable answer in one of the branch destinations, and does not overlap with the subrange of the variable answer in the other branch destination. In addition, there is no other instruction that references to the variable answer. Accordingly, the determination made by the determination unit 830 is true.

As another example, the intermediate program 24B of FIG. 6 includes, in line 3, an instruction to assign a value of an equation (i-offset) to the variable answer. The subrange of this variable answer is an integer not less than 0 according to the result of the aforementioned analysis. In the meantime, the intermediate program 24B of FIG. 6 includes, in line 8, a conditional branch instruction that compares the variable answer with a constant −1. The subrange of the variable answer in one of branch destinations of this conditional branch instruction is other than −1, and the subrange of the variable answer in the other branch destination is only −1.

In this example, the subrange of the variable answer in the assignment instruction includes the subrange of the variable answer in one of branch destinations, and does not overlap with the subrange of the variable answer in the other branch destination. In addition, there is no other instruction that references to the variable answer. Accordingly, the determination made by the determination unit 830 is true.

Under the condition that the determination made by the determination unit 830 is true, the replacement unit 840 accesses the storage device 1040, and then replaces the instruction to assign a value to the variable with an instruction to assign a constant value within the subrange of the variable for the instruction to the variable; thereby, changing the intermediate program 24. For example, since the range of the value assigned by the assignment instruction in line 3 is not less than 0 in the intermediate program 24A, the replacement unit 840 replaces this assignment instruction with an assignment instruction to assign 1, which is a constant not less than 0, to the variable.

As another example, the range of the value to be assigned by the assignment instruction in line 3 in the intermediate program 24B is other than null, so that the replacement unit 840 replaces this assignment instruction with an instruction to assign 0x0000beef, which is a pointer other than null. The program that has been changed is stored as the intermediate program 26 in the storage device 1040.

The idiom detection unit 850 detects, rather than a simple assignment statement, processing for assigning a result of a predetermined series of processing (called an idiom) to a variable. For more details on idiom detection, refer to M. Kawahito et al., A new idiom recognition framework for exploiting hardware-assist instructions, ASPLOS'06. Then, with the determination unit 830 and the replacement unit 840, the idiom detection unit 850 optimizes this detected idiom. This processing will be described later in more details.

Figure 9:
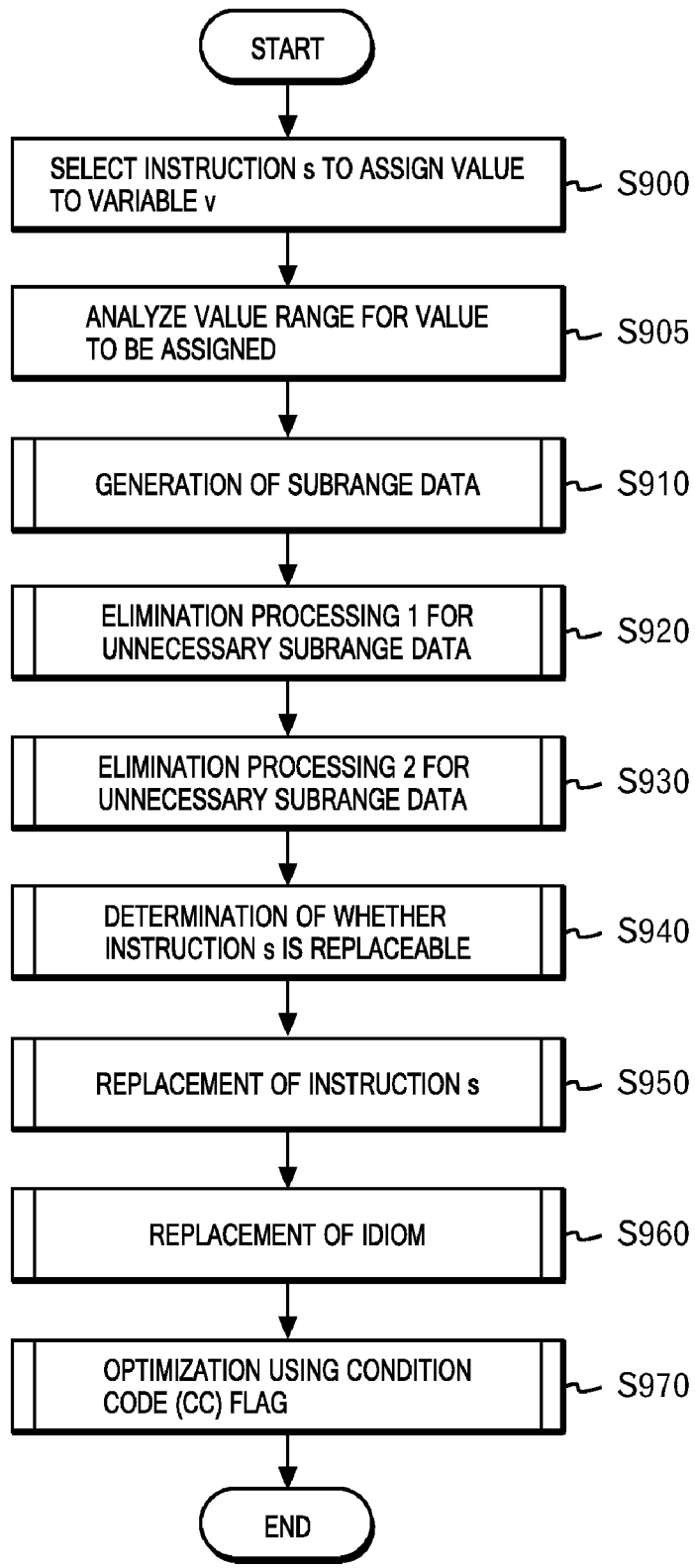
FIG. 9 shows a processing flow in which an assignment instruction is optimized by the assignment optimization unit 110 according to the embodiment.

FIG. 9 shows a processing flow in which an assignment instruction is optimized by the assignment optimization unit 110 according to the present embodiment. The subrange analysis unit 800 firstly selects an instruction s to assign a value to a variable v in the intermediate program 24 (S900). Then, the subrange analysis unit 800 performs the following processing as to the instruction s (S900).

The subrange analysis unit 800 analyzes the value range within which the instruction s can assign a value to the variable v, as the subrange of the variable v in a case where the instruction s is executed (S905). In addition, for each of all the instructions that reference to the variable v in the intermediate program 24, the data generation unit 805 analyzes the subrange of the variable in a case where each of the instructions is executed (S910). The results of the analyses are outputted as the value range data 50 to the determination unit 830. This processing will be described in detail with reference to FIG. 10.

Figure 10:
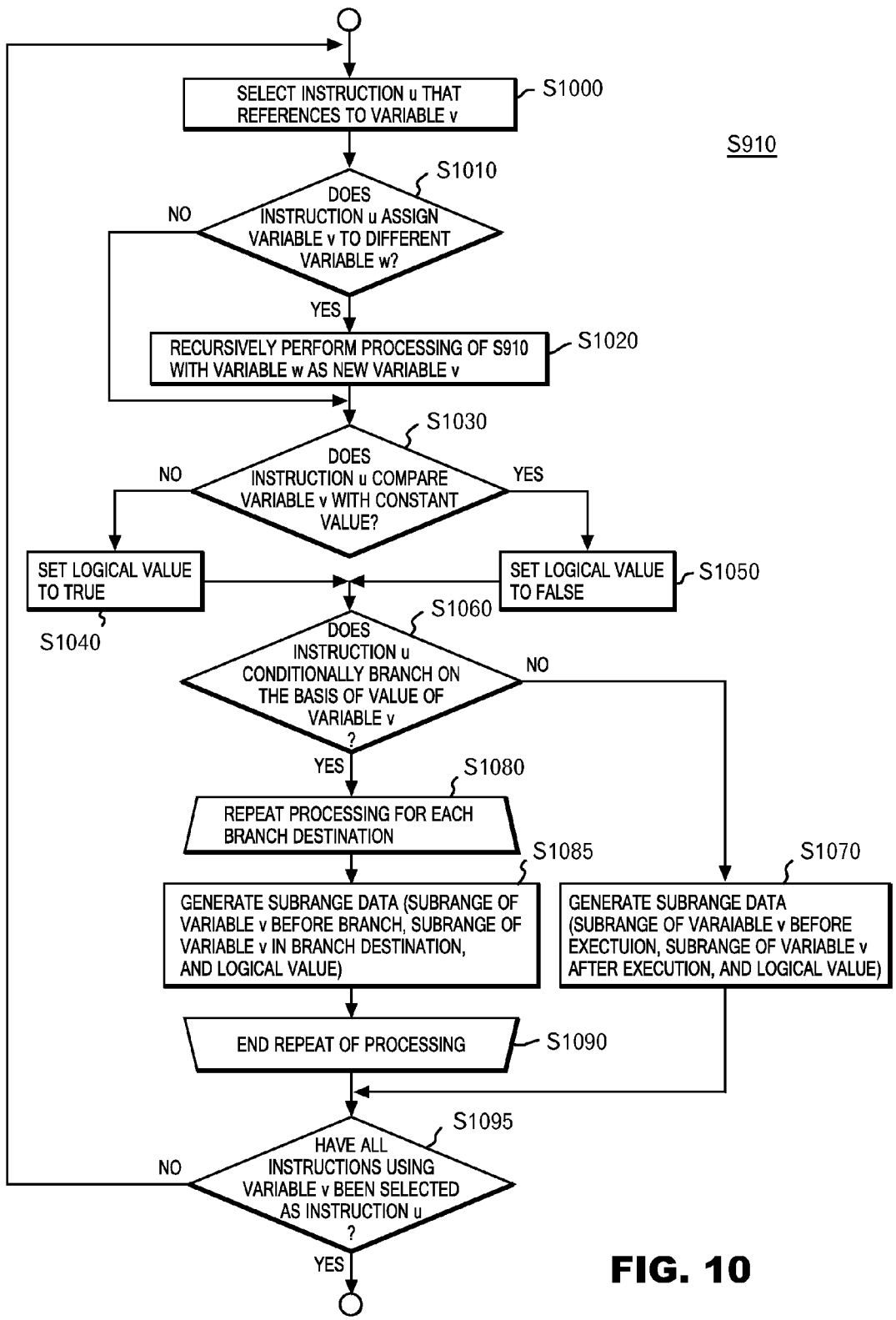
FIG. 10 shows the processing of S910 in FIG. 9 in detail.

FIG. 10 shows the processing of S910 in FIG. 9 in detail. First, the data generation unit 805 selects an instruction u that refers to the variable v (S1000). Next, the data generation unit 805 determines if the instruction u is an instruction to assign the variable v to a different variable w (S1010).

In a case where the instruction u is an instruction to assign the variable v to the different variable w (S1010: YES), the data generation unit 805 considers the variable w to be a new variable v, and then recursively performs the processing of S910 (S1020).

Next, the data generation unit 805 determines if the instruction u is an instruction to compare the variable v with a constant value (S1030). In a case where the instruction u is an instruction to compare the variable v with a constant value (S1030: YES), a logical value utilized by later processing is set to be FALSE by the data generation unit 805 (S1050). This logical value FALSE indicates a state where there is a possibility that the value of the variable v is replaced with a predetermined different constant.

On the other hand, in a case where the instruction u is not an instruction to compare the variable v with a constant value (S1030: NO), the data generation unit 805 sets the logical value utilized by later processing to TRUE (S1040). This logical value TRUE indicates a state where the value of the variable v cannot be replaced with any different value at all.

Next, the data generation unit 805 determines if the instruction u is a conditional branch instruction based on the value of the variable v (S1060). In a case where the instruction u is not such a conditional branch instruction (S1060: NO), the data generation unit 805 generates one piece of subrange data for this instruction u. Such subrange data is data formed of three elements including the subrange of the variable v immediately before the instruction u is executed, the subrange of the variable v immediately after the instruction u is executed and the aforementioned logical value indicating if the instruction u is an instruction to compare the variable v with a constant.

On the other hand, in a case where the instruction u is a conditional branch instruction based on the value of the variable v (S1060: YES), the data generation unit 805 repeats the next processing, for each branch destination of the conditional branch instruction (S1080-S1090). This processing is the processing for generating, as subrange data, the data formed of three elements including the subrange of the variable v immediately before the conditional branch instruction is executed, the subrange of the variable v immediately after the conditional branch instruction is executed and the aforementioned logical value (S1085).

Assuming that the variable answer is selected as the variable v in the example of the intermediate program 24A of FIG. 3, subrange data (all range, other than null, FALSE) and subrange data (all range, null, FALSE) for the conditional branch instruction of line 6 based on the value of the variable answer are generated. Moreover, if the variable answer is selected as the variable v in the example of the intermediate program 24B of FIG. 6, subrange data (all range, other than −1, FALSE) and value range data (all range, −1, FALSE) are generated for the conditional branch instruction of line 8 based on the value of the variable answer.

The pieces of the generated subrange data are sequentially added to the subrange data 50 indicating a set of subrange data. In addition, the subrange data generated by the recursive processing described as the processing of the aforementioned step S1020 is also combined into the subrange data 50. In a case where a plurality of pieces of value range data, which are exactly the same, are included in the subrange data 50, the data generation unit 805 eliminates all the pieces of the same subrange data except one. Next, the data generation unit 805 determines if all instructions using the variable v have been selected as the instruction u (S1095). If there is an instruction that has not been selected (S1095: NO), the data generation unit 805 causes the operation to return to the processing of step S1000, and repeats the processing. If all instructions have been selected (S1095: YES), the data generation unit 805 ends the processing of step S910.

The description will be continued with reference to FIG. 9 again. The first data elimination unit 810 deletes unnecessary subrange data from the subrange data 50, as elimination processing 1 (S920).

Figure 11:
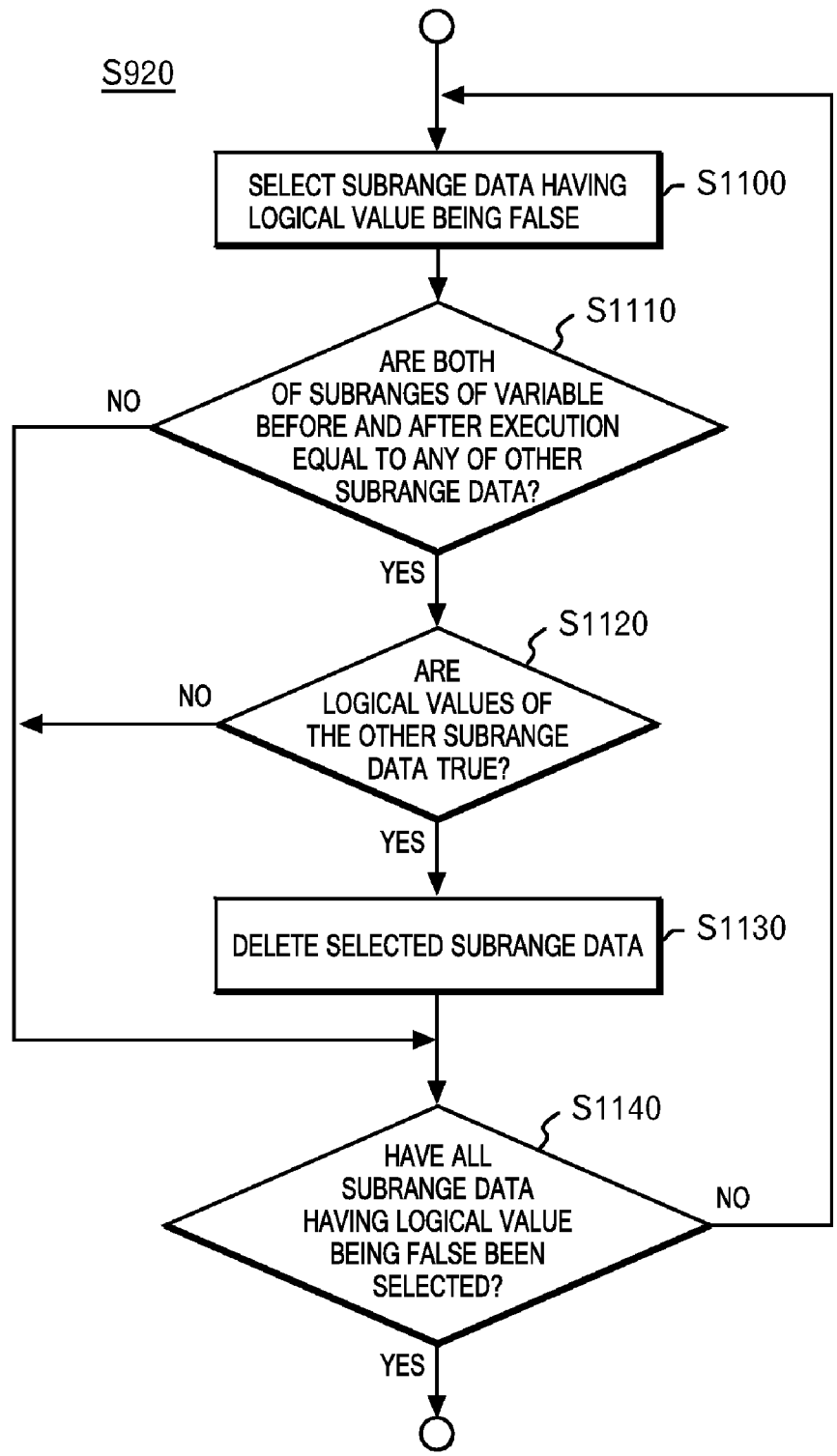
FIG. 11 shows the processing of S920 in FIG. 9 in detail.

FIG. 11 shows the processing of S920 in FIG. 9 in detail. Firstly, the first data elimination unit 810 selects one piece of subrange data having the logical value FALSE from the subrange data 50 (S1100). Then, the first data elimination unit 810 compares the selected subrange data with any one of other pieces of subrange data, and determines if pairs of the subranges of the variable immediately before or after the execution are equal to one another (S1110).

In a case where the pairs of the subranges are equal to one another (S1110: YES), the first data elimination unit 810 determines if the logical value of the selected subrange is TRUE (S1120). In a case where the logical value is TRUE (S1120: YES), the first data elimination unit 810 deletes the selected subrange (S1130). Then, the first data elimination unit 810 determines if all the pieces of the subrange data each having the logical value FALSE have been selected (S1140).

If the all the pieces of the subrange data each having the logical value FALSE have not been selected (S1140: NO), the first data elimination unit 810 causes the operation to return to the processing of S1100, and selects the next subrange data (S1100). If all the pieces of the subrange data have been selected (S1140: YES), the first data elimination unit 810 ends the processing of S920.

As described above, according to the processing of S920, in a case where the variable v is compared with a constant for a conditional branch instruction, and where the variable v is used in an arithmetic operation in the branch destination, the optimization can be appropriately controlled by leaving the information specifically indicating the value of the variable is necessary.

The description will be continued with reference to FIG. 9 again. The second data elimination unit 820 further deletes unnecessary subrange data in the subrange data 50 as the second elimination processing (S930).

Figure 12:
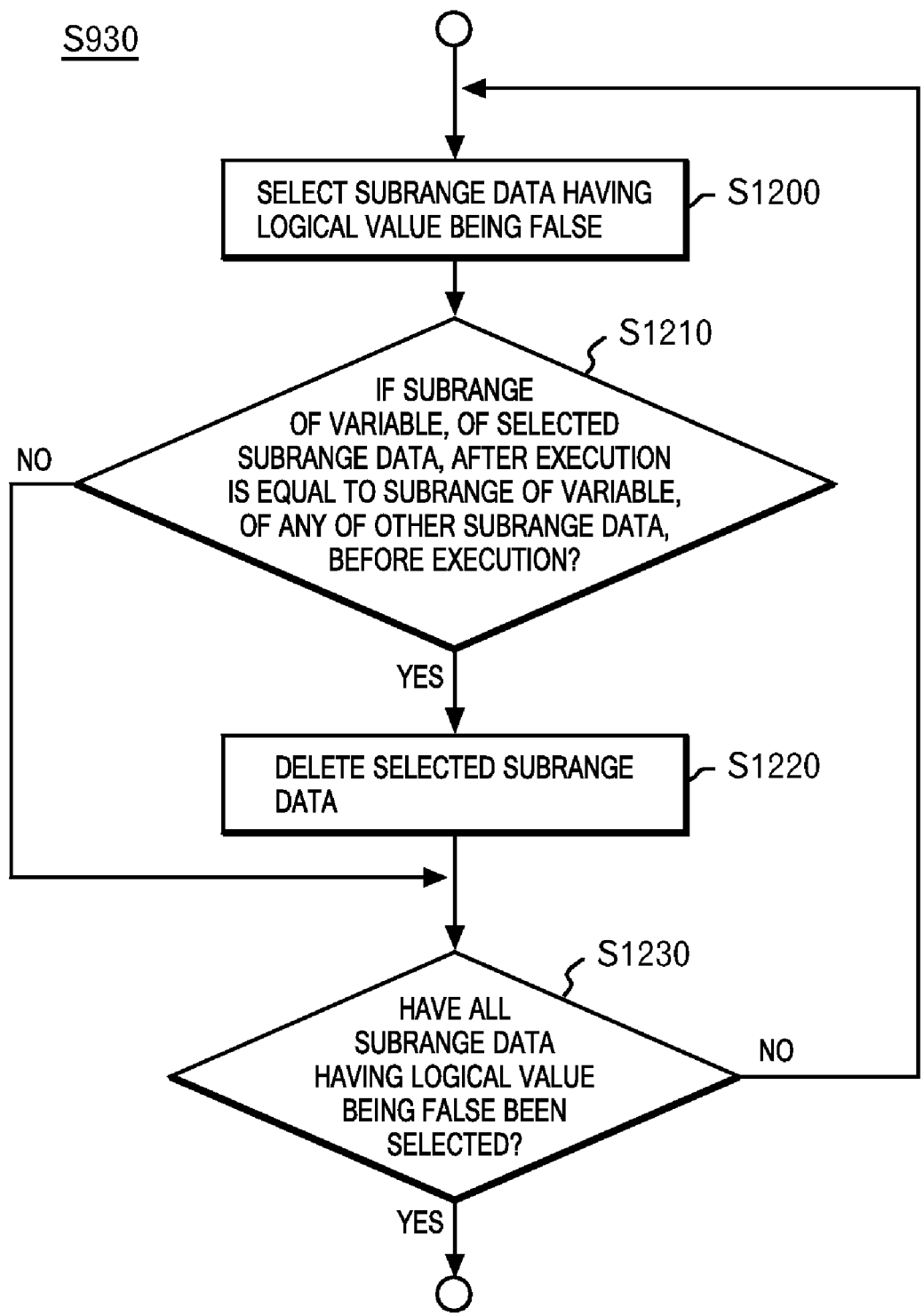
FIG. 12 shows the processing of S930 in FIG. 9 in detail.

FIG. 12 shows the processing of S930 in FIG. 9 in detail. Firstly, the second data elimination unit 820 selects one piece of subrange data having the logical value FALSE from the subrange data 50 (S1200). Then, the second data elimination unit 820 determines if the subrange of the variable after the execution, the subrange being included in the selected subrange data is equal to a subrange of the variable before the execution, the subrange being included in any different piece of subrange data (S1210).

In a case where the subranges are equal (S1210: YES), the second data elimination unit 820 deletes the selected subrange data (S1220). Then, the second data elimination unit 820 determines if all the pieces of the subrange data each having the logical value FALSE have been already selected from the subrange data 50 (S1230). If not all the pieces of data have been selected (S1230: NO), the second data elimination unit 820 causes the operation to return to the processing of S1200, and selects different subrange data. If all the pieces of data have already been selected (S1230: YES), the second data elimination unit 820 ends the processing of S930.

As has been described above, according to this second elimination processing, in a case where "the subrange of the variable after the execution" of certain subrange data partially overlaps with "the subrange of the variable after the execution" of different subrange data, one of the pieces of the subrange data can be deleted while the other piece of the subrange data having a narrower range is left in the subrange data 50. Thereby, a conditional branch indicating an intermediate determination can be eliminated from the determination targets in a nesting structure of a conditional branch as in the case of a binary search, for example.

The description will be continued with reference to FIG. 9 again. Next, on the basis of the subrange data 50, the determination unit 830 determines if the execution result of the intermediate program 24 changes even if the instruction s assigns any value within the subrange analyzed in S905 for the assignment instruction s to the variable v (S940).

Figure 13:
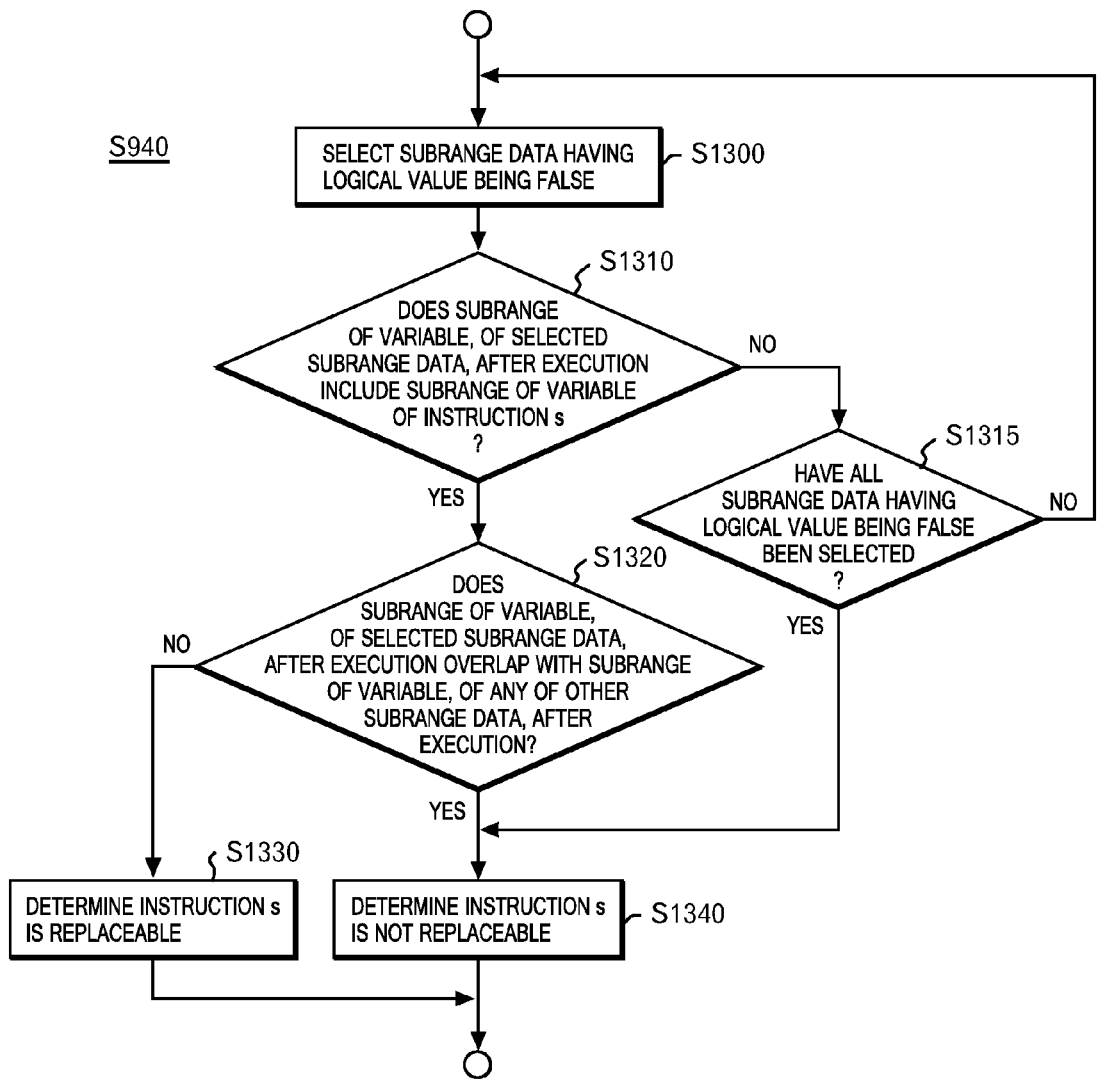
FIG. 13 shows the processing of S940 in FIG. 9 in detail.

FIG. 13 shows the processing of S940 in FIG. 9 in detail. Firstly, the determination unit 830 accesses the storage device 1040, then selects subrange data having the logical value FALSE from the subrange data 50 and reads the subrange data (S1300).

Next, the determination unit 830 determines if the subrange of the variable after the execution, the subrange being of the selected subrange data, includes the subrange of the variable of the instruction s (S1310). If the subrange does not include the subrange of the variable of the instruction s (S1310: NO), the determination unit 830 determines if all the pieces of the subrange data each having the logical value FALSE have been selected from the subrange data 50 (S1315).

If not all the pieces of the subrange data have not been selected (S1315: NO), the determination unit 830 causes the operation to return to the processing of S1300, and then selects the next subrange data. If all the pieces of the subrange data have been selected (S1315: YES), the determination unit 830 determines that the assignment instruction (s) cannot be replaced with an assignment instruction to assign a constant value (S1340), and then ends the processing of S940.

On the other hand, under the condition that the subrange of the variable after the execution, the subrange being included in the selected subrange data, includes the subrange of the variable of the instruction s (S1310: YES), the determination unit 830 determines if the subrange of the variable after the execution overlaps with a subrange of the variable after the execution, the subrange being included in any other subrange data (S1320). Under the condition that the subrange of the variable does not overlap with the subrange included in any other subrange data (S1320: NO), the determination unit 830 determines that the instruction s can be replaced with an assignment instruction to assign a constant value (S1330). On the other hand, under the condition that the subrange of the variable overlaps with a subrange included in any other subrange data (S1320: YES), the determination unit 830 determines that the instruction s cannot be replaced with an assignment instruction to assign a constant value (S1340).

The description will be continued with reference to FIG. 9 again. Provided that the determination made by the determination unit 830 is true, the replacement unit 840 replaces the instruction s to assign a value to the variable v with an instruction to assign, to the variable v, a constant value within the range of the value to be assigned by the instruction s (S950).

Figure 14:
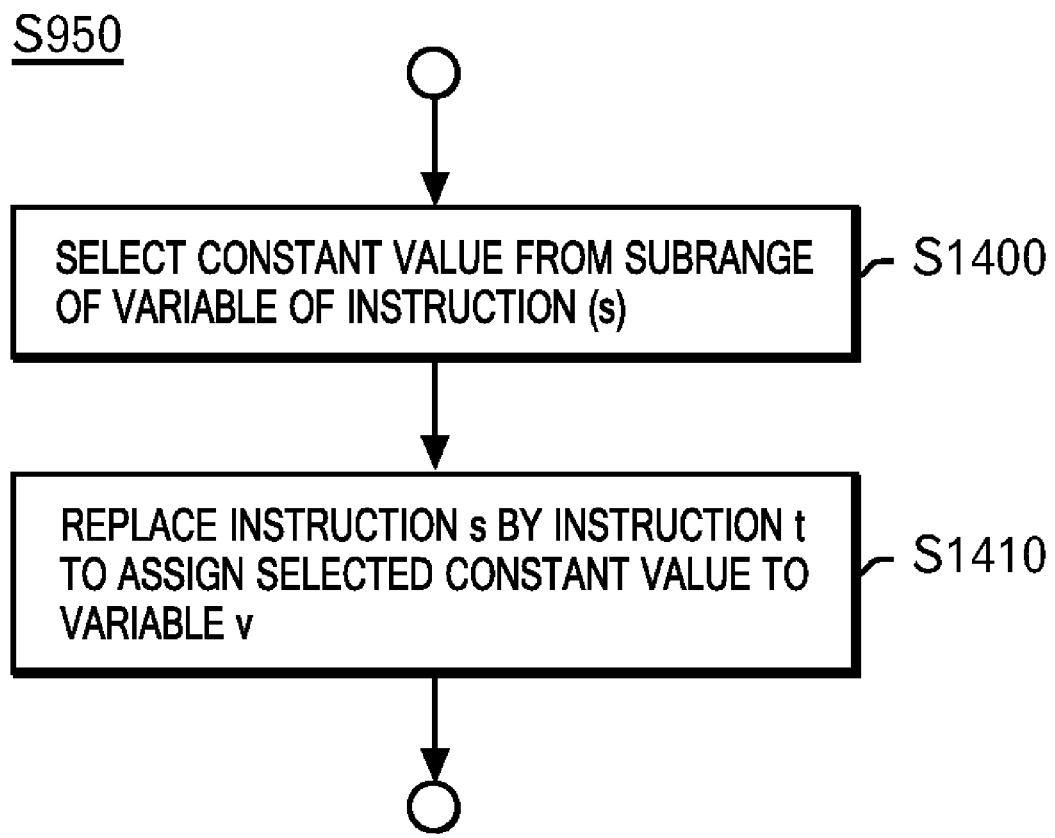
FIG. 14 shows the processing of S950 in FIG. 9 in detail.

FIG. 14 shows the processing of S950 in FIG. 9 in detail. The replacement unit 840 firstly selects a constant value from the value range of the variable v to be assigned by the instruction (S1400), and replaces the instruction s with an instruction to assign the selected constant value to the variable v (S1410).

For example, the replacement unit 840 selects, from the subrange of the variable for the instruction s to be replaced, a value within the range of an immediate value capable of being loaded in a register by a single instruction in the computer executing the execution code obtained by compiling the intermediate program 24. The replacement unit 840 may preferably select a value having the minimum absolute value from the subrange of the variable for the instruction s to be replaced.

Moreover, the replacement unit 840 may select a power-of-two value from the subrange of the variable for the instruction s to be replaced. Then, the replacement unit 840 replaces the instruction s with an instruction to assign the selected value to the variable. Thereby, the computer is allowed to execute the execution code corresponding to the instruction s in an extremely short period of time such as an execution cycle for a single instruction, for example.

The description will be continued with reference to FIG. 9 again. In addition to the aforementioned instruction s, the idiom detection unit 850 further detects a predetermined first idiom from the intermediate program 24 for the purpose of broadening the opportunity of the optimization (S960).

Figure 15:
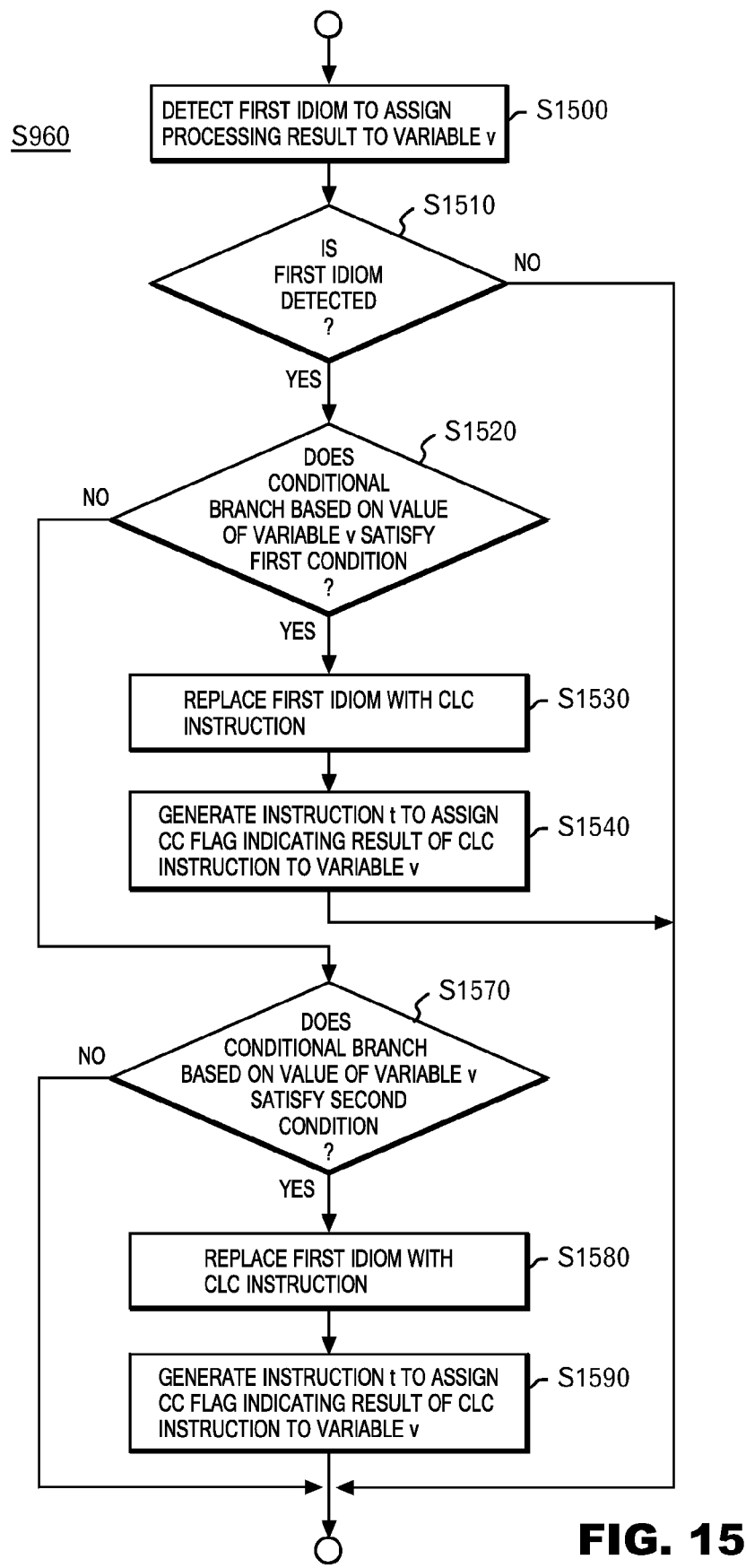
FIG. 15 shows the processing of S960 in FIG. 9 in detail.

FIG. 15 shows the processing of S960 in FIG. 9 in detail. The idiom detection unit 850 detects, by scanning the intermediate program 24, the first idiom for assigning a processing result to the variable v (S1500). This first idiom is processing for reading a predetermined number of elements from each of a plurality of array variables and then sequentially comparing the elements with one another from the top. In this processing, in a case where a different element value is detected, the difference, between the element values, detected first is assigned to the variable v On the other hand, in a case where a different element values are not detected, the numeric value 0 is assigned to the variable v.

Figure 16:
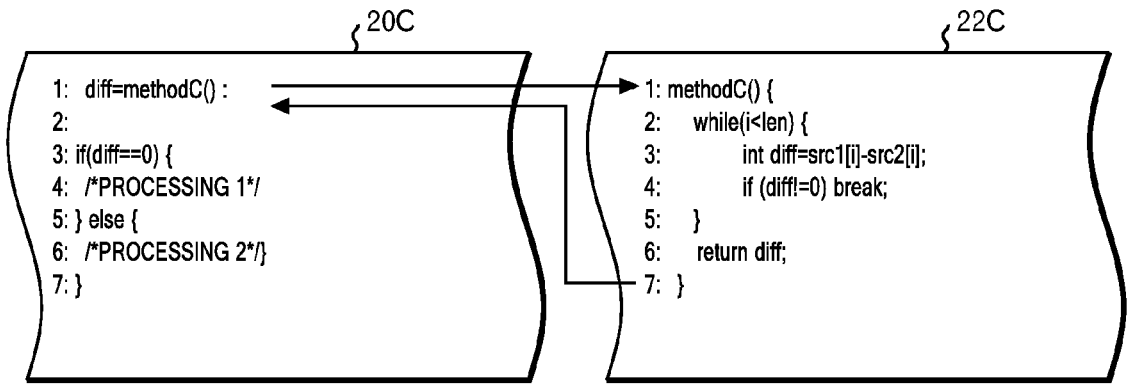
FIG. 16 shows specific examples of an input program 20C and a library program 22C according to the embodiment.
Figure 17:
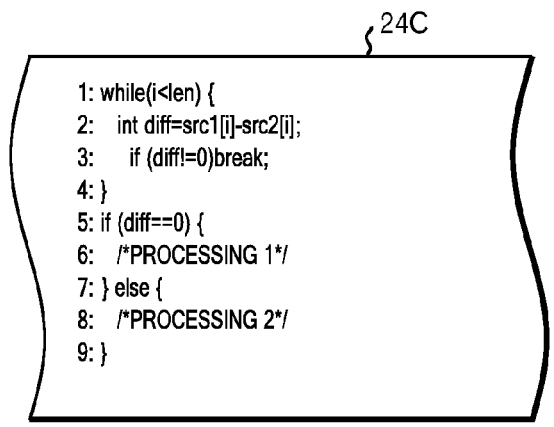
FIG. 17 shows a specific example of an intermediate program 24C according to the embodiment.

An example of the first idiom is shown in FIGS. 16 and 17.

FIG. 16 shows specific examples of an input program 20C and a library program 22C according to the present embodiment. The input program 20C includes an instruction to call a method termed as methodC in line 1, and then to assign the return value thereof to a variable called diff. Moreover, the input program 20C includes, in lines 3 to 7, an instruction to perform processing 1 if the value of the variable diff is equal to a constant 0, or to perform processing 2 if the value of the variable diff is different from the constant 0.

On the other hand, the library program 22C includes the definition of methodC in lines 1 to 7. Specifically, the library program 22C includes in lines 2 to 5 an instruction set for reading a predetermined number len of elements from each of two array variables called src1 and src2, and compares the elements with one another. In a case where a different element value is detected, the instruction set assigns the difference between the element values to the variable diff, and in a case where no different element value is found, the numeric value 0 is assigned to the variable diff. Moreover, the library program 22C includes, in line 6, an instruction to return the value of the variable diff.

FIG. 17 shows a specific example of the intermediate program 24C according to the present embodiment. In this example, each instruction in methodC is expanded without being modified except for the instruction to return a return value, in lines 1 to 4. Accordingly, the idiom detection unit 850 can detect, as the first idiom, the instruction set in lines 1 to 4 of the intermediate program 24C.

The description will be continued with reference to FIG. 15 again. In a case where the first idiom is detected (S1510: YES), the determination unit 830 determines if a conditional branch instruction based on the value of the variable v satisfies a first condition (S1520). The first condition is a condition that the subrange of the variable v in the first branch destination of an instruction that conditionally branches on the basis of the value of the variable v includes only the numeric value 0, and that the subrange of the variable v in the second branch destination of the instruction includes only values other than the numeric value 0.

The intermediate program 24C of FIG. 17, for example, includes, in lines 5 to 9, a conditional branch instruction to determine if a condition that the variable diff is equal to the constant number 0 is true. In the first branch destination of this conditional branch instruction, for example, in line 6, the subrange of the variable diff includes only the numeric value 0. In the meantime, in the second branch destination of this conditional branch instruction, for example, in line 9, the subrange of the variable diff includes only a value other than the numeric value 0. Accordingly, if this variable diff is selected as the variable v, the determination unit 830 can determine that the instruction set in lines 5 to 9 satisfies the first condition.

In lines 5 to 9 of the intermediate program 24C, the value of the variable diff is used only for comparing the value with a constant 0, and not used for any other purpose. Accordingly, the processing for calculating a difference between element values as shown in line 2 of the intermediate program 24C is useless. For this reason, if it can be found, by comparing the array variable src1 with the array variable src2, that there is an element having a different element value, there is no need to perform the calculation to find how large the difference is. The replacement unit 840 thus can replace the first idiom with predetermined processing by utilizing such a characteristic.

The description will be continued with reference to FIG. 15 again. Under the condition that a first idiom is detected, and that the conditional branch instruction based on the value of the variable v satisfies the first condition (S1520: YES), the replacement unit 840 replaces the detected first idiom with predetermined processing defined on the basis of the first idiom (S1530). This predetermined processing is processing for reading a predetermined number of elements from each of a plurality of array variables and then comparing the elements with one another. Furthermore, in this processing, a predetermined constant other than 0 is assigned to the variable v in a case where a different element value is detected. On the other hand, the numeric value 0 is assigned to the variable v in a case where no different element value is detected.

In a case where the program is to be compiled for System z or System p architecture from IBM Corporation, this predetermined processing is implemented by use of a CLC instruction included in System z or System p architecture. The CLC instruction, however, causes the processing result to be stored in a special storage area called a condition code (CC) flag. Accordingly, the replacement unit 840 generates an instruction to load content of this CC flag in the variable v (to be more precise, in a register or memory area assigned to the variable v) (S1540). This instruction is termed as an instruction t.

An example of the program generated by the replacement unit 840 in the aforementioned manner is shown in FIG. 18.

FIG. 18 shows a specific example of the intermediate program 26C according to the present embodiment. A CLC instruction is shown in line 1. For the purpose of clarifying the description, the processing content is shown herein rather than the execution code of the CLC instruction. In addition, the entire contents in lines 2 to 6 indicate the instruction t to load the content of the CC flag in the variable diff. The contents in lines 7 to 11 are the same as those in lines 5 to 9 of the intermediate program 24C of FIG. 17.

The description will be continued with reference to FIG. 15 again. In a case where the first idiom is detected, but the conditional branch instruction does not satisfy the first condition (S1520: NO), the determination unit 830 determines if the conditional branch instruction satisfies the second condition (S1570). The second condition is a condition that the subrange of the variable v in the first branch destination of the conditional branch instruction conditionally branching on the basis of the value of the variable v includes only the numeric value 0, that the subrange of the variable v in the second branch destination of the conditional branch instruction includes only a positive number, and that the subrange of the variable v in the third branch destination of the conditional branch instruction includes only a negative number.

A specific example of this conditional branch condition is shown in FIGS. 19 to 20.

FIG. 19 shows specific examples of an input program 20D and a library program 22D according to the present embodiment. The input program 20D includes, in line 1, an instruction to call a method named methodC and to assign the return value to a variable diff. In addition, the input program 20D includes, in lines 3 to 7, an instruction to perform processing 1 if the value of the variable diff is equal to a constant 0, to perform processing 2 if the value of the variable diff is a positive number, and to perform processing 3 if the value of the variable diff is a negative number. The library program 22D includes the definition of methodC in lines 1 to 7. Since this definition is same as the definition of methodC shown in lines 1 to 7 of the library program 22C, the description thereof is omitted here.

FIG. 20 shows a specific example of the intermediate program 24D according to the present embodiment. In lines 1 to 4 of the program, each instruction in methodC is expanded without being modified except for the instruction to return a return value. In addition, the conditional branch instruction in lines 5 to 11 is same as the conditional branch instruction in lines 3 to 9 of the input program 20D. This conditional branch instruction is a conditional branch instruction to compare the variable diff with a constant 0.

In the first branch destination of this conditional branch instruction, for example, in line 6, the subrange of variable diff includes only the numeric value 0. In the meantime, in the second branch destination of this conditional branch instruction, for example, in line 8, the subrange of the variable diff includes only a positive number. Moreover, in the third branch destination of this condition branch instruction, the subrange of the variable diff includes only a negative number. Accordingly, if this variable diff is selected as the variable v, the determination unit 830 determines that the instruction set in lines 3 to 9 satisfies the second condition.

The description will be continued with reference to FIG. 15. Under the condition that the first idiom is detected and that the conditional branch instruction based on the value of the variable v satisfies the second condition (S1570: YES), the replacement unit 840 replaces the detected first idiom with predetermined processing determined on the basis of the first idiom (S1580). This predetermined processing is processing for reading a predetermined number of elements from each of a plurality of array variables and for comparing the elements with one another. In this predetermined processing, the numeric value 0 is assigned to the variable v in a case where no different element value is detected. On the other hand, in a case where an element of one of the array variables is larger than an element of a different one of the array variables, a given positive constant is assigned to the variable v in this given processing. On the other hand, in a case where the element in the different one of the array variables is larger than the element in the one of the array variables, a given negative constant is assigned to the variable v in the predetermined processing.

In a case where the program is to be compiled for System z architecture from IBM Corporation, this predetermined processing is implemented by use of a CLC instruction included in System z architecture. The CLC instruction, however, causes the processing result to be stored in a special storage area called a condition code (CC) flag. Accordingly, the replacement unit 840 generates an instruction to load content of this CC flag in the variable v (to be more precise, in a register or memory area assigned to the variable v) (S1590). This instruction is termed as an instruction t.

An example of the program generated by the replacement unit 840 in the aforementioned manner is shown in FIG. 21.

FIG. 21 shows a specific example of the intermediate program 26D according to the present embodiment. A CLC instruction is shown in line 1. For the purpose of clarifying the description, the processing content is shown herein rather than the execution code of the CLC instruction. In addition, the entire contents in lines 2 to 8 indicate the instruction t to load the content of the CC flag in the variable di ff. The contents in lines 9 to 15 are the same as those in lines 5 to 11 of the intermediate program 24C of FIG. 20.

As described above, as a result of the detection of the first idiom, the entire instruction set to compare elements of a plurality of array variables with one another is optimized in addition to the instruction to calculate a numeric value and then to assign the value to a variable. Thereby, the execution efficiency of the program can be significantly improved. Furthermore, with such optimization, the execution efficiency of the program can be further increased by use of a special instruction supported by a particular architecture.

Next, a description will be given of additional processing used for further improving the efficiency of the program generated through the aforementioned optimizations. The first object of this processing is to cause an instruction to conditionally branch, by use of a variable as it is without assigning a CC flag to the variable. In addition, the second object of the processing is to select a constant to be assigned to the variable from the outside of the subrange of the variable.

Figure 22:
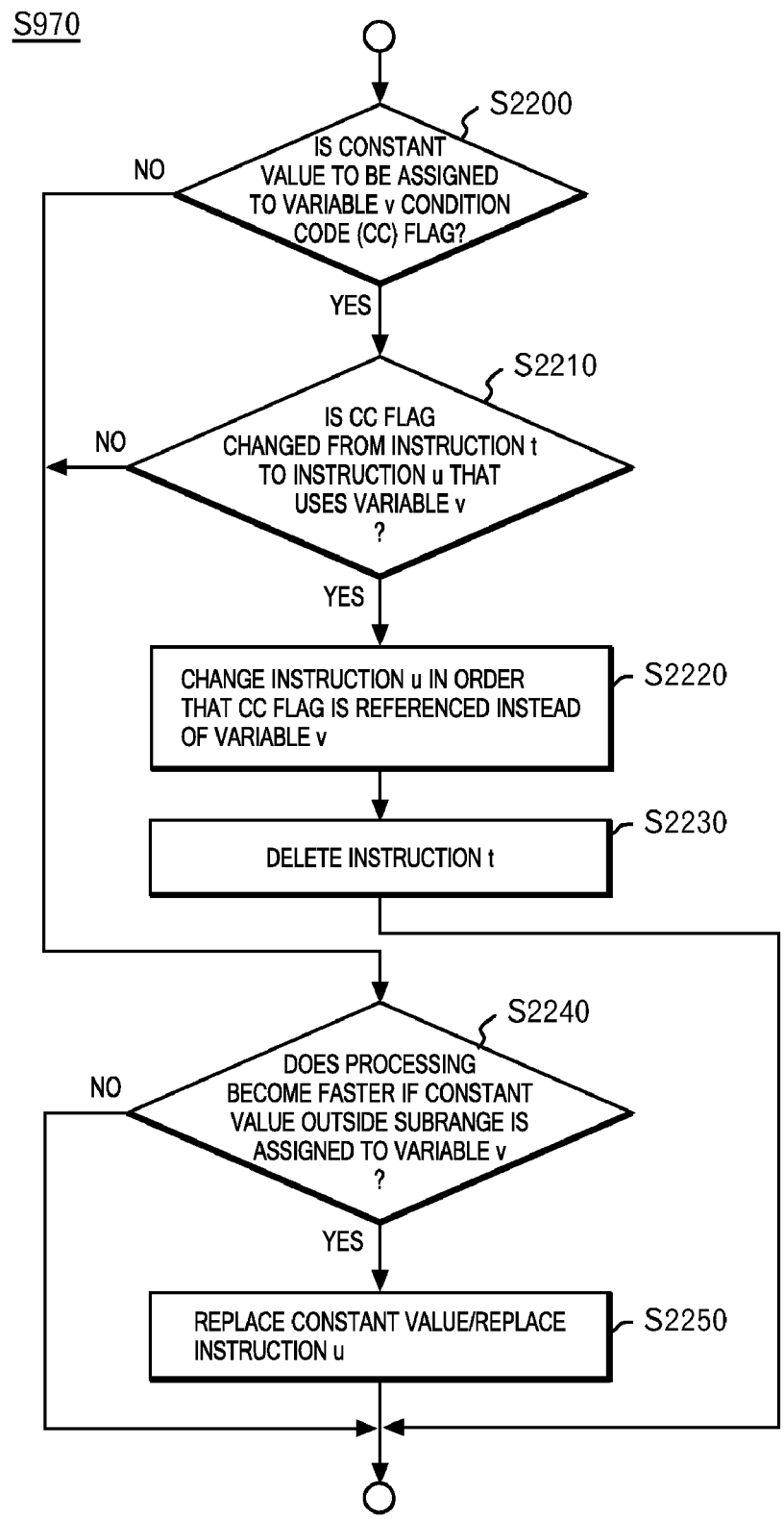
FIG. 22 shows the processing of S970 in FIG. 9 in detail.

FIG. 22 shows the processing of S970 in FIG. 9 in details. First, the replacement unit 840 determines if a constant value to be assigned to the variable v is a numeric value representing the content of a CC flag as it is (S2200). The instruction to assign the constant value to the variable v is called an instruction t. Under the condition that the constant value to be assigned to the variable v by the instruction t is a numeric value representing the content of the CC flag as it is (S2200: YES), the replacement unit 840 determines if the content of the CC flag does not change during the processing from the execution of the instruction t to the execution of any instruction using the variable v, either (S2210).

In the example of the intermediate program 26C of FIG. 18, for example, the instruction in lines 2 to 6 is the instruction t to assign a constant representing the content of the CC flag as it is to the variable di ff. In addition, the instruction in line 7 is an instruction that references to the variable diff. Then, the content of the CC flag does not change during the processing from the execution of this instruction t to the execution of the instruction that references to the variable diff. Accordingly, the determinations in S2200 and S2210 are true.

The description will be continued with reference to FIG. 22 again. Under the condition that the content of the CC flag does not change (S2210: YES), the replacement unit 840 replaces an instruction u that conditionally branches on the basis of the value of the variable v with an instruction that conditionally branches on the basis of the CC flag (S2220). Then, the replacement unit 840 deletes the instruction t that has become unnecessary (S2230). A program to which the aforementioned processing is applied is shown in FIG. 23.

FIG. 23 shows another specific example of the intermediate program 26C according to the present embodiment. Line 1 of the intermediate program 26C of this example is the same as that of the intermediate program 26C of FIG. 18. However, the lines 2 to 7 of FIG. 18 corresponding to the instruction t are deleted in the intermediate program 26c of FIG. 23. In addition, the lines 7 to 11 corresponding to the conditional branch instruction based on the variable diff are replaced with the conditional branch instruction based on the CC flag.

As described above, according to the above-described processing, the execution efficiency of the program can be improved by omitting the processing for storing the content of the CC flag in the variable. Moreover, since a conditional branch instruction based on the content of a CC flag can operate faster than a conditional branch instruction based on a variable value in general, the execution of the conditional branch instruction can be made faster according to the above-described processing.

The description will be continued with reference to FIG. 22 again. For the instruction u that references to the variable v, the replacement unit 840 next determines if the intermediate program 24 as a whole can operate fast when a constant value outside the subrange of the variable is assigned to the variable v in comparison with a case where a constant value within the subrange of the variable is assigned to the variable v, for the instruction u (S2240). An example of this determination will be described with reference to FIGS. 24 and 25 as well as FIG. 21.

As shown in FIG. 21, it is determined, in lines 9 to 15 of the intermediate program 26D, whether the variable diff is 0, a positive number or a negative number. Accordingly, in lines 2 to 8, any one of 0, a positive constant number and a negative constant number is assigned to the variable diff. When the assignment instruction of lines 2 to 8 is to be compiled for System z architecture from IBM Corporation, the assignment instruction is converted into the execution code as shown in FIG. 24, for example.

FIG. 24 shows an example of the execution code corresponding to the instructions in lines 2 to 8 of the intermediate program 26D according to the present embodiment. The instruction in line 1 is an insert program mask (IPM) instruction that causes the content of the CC flag to be stored in the second and the third bits of register R1. The zero and the first bits are initialized with 0.

The instruction in line 2 is an SLL instruction to shift R1 by 2 bits. The instruction in line 3 is an SRA instruction to perform an arithmetic shift right on R1 by 30 bits. The instruction in line 4 is an LCR instruction to reverse the sign by considering R1 to be an integer. Thereby, depending on the content of the CC flag, 0, −1 or 2 is assigned to register R1 assigned for storing the content of the variable diff.

In the meantime, an example of the intermediate program 26D in a case where a value outside the subrange of the variable is assigned to the variable diff, for example, is shown in FIG. 25A.

FIG. 25A shows another specific example of the intermediate program 26D according to the present embodiment in contrast with the execution code corresponding to the instructions in line 2 to 8. As shown in FIG. 25A, 0, 1 or 2 is assigned to the variable diff in lines 2 to 8 on the basis of the content of the CC flag. Specifically, while the subrange of the variable diff is 0, a positive number or a negative number, the constant value to be assigned is 0, a positive number 1 or a positive number 2.

Note that the conditional branch instruction based on the variable diff is also changed so that the meaning of the program does not change. Specifically, in line 11, if processing 2 is to be executed is determined on the basis of the condition that the variable diff is equal to the constant number 2 rather than the condition that the variable diff is a positive number. An example of an execution code obtained by compiling this intermediate program 25D for System z architecture from IBM Corporation is shown in FIG. 25B.

The instruction in line 1 is an insert program mask (IPM) instruction to cause the content of the CC flag to be stored in the second and the third bits of register R1. The zero and the first bits are initialized with 0. The instruction in line 3 is an SRA instruction to perform an arithmetic shift right on R1 by 28 bits.

As described above, in contrast between FIG. 25B and FIG. 24, the number of machine language instructions is reduced from 4 to 2. In a case where such reduction in the number of instructions occurs as a result of changing the constant value to be assigned to the variable v, the replacement unit 840 determines that the program can be executed faster. As a specific method of making the determination, the replacement unit 840 may compile each of the programs of these two cases, and then compare the numbers of machine language instructions with each other.

In addition, the replacement unit 840 may record, in association with a predetermined plurality of instruction sequences prior to compiling, the amounts of time required for the execution of the respective execution codes each to be generated if the corresponding instruction sequence is compiled. Then, the replacement unit 840 determines if the respective programs before and after the constant value to be assigned to the variable v is changed match with the corresponding previously-recorded instruction sequences. Then, the replacement unit 840 may compare the amounts of time required for the execution of the respective execution codes corresponding to the recorded instruction sequences matched with the respective programs.

The description will be continued with reference to FIG. 22 again. Next, for the instruction u to reference to the variable v, in a case where the intermediate program 24 as a whole operates fast when the constant value outside the subrange of the variable is assigned to the variable v in comparison with a case when the constant value within the subrange of the variable for the instruction u is assigned to the variable v (S2240: YES), the replacement unit 840 changes the constant value to be assigned to the variable v and the constant value used by the instruction u for a comparison with the variable v.

Specifically, the replacement unit 840 replaces the instruction to assign the value to the variable v with an instruction to assign a constant value selected from the outside of the subrange of the variable v for the instruction. In the meantime, the replacement unit 840 changes a certain instruction that conditionally branches on the basis of the value of the variable v in order that the subrange of the variable v for the certain instruction can include the selected constant value. Thereby, the intermediate program 26D shown in FIG. 21, for example, is changed to the intermediate program 26D shown in FIG. 25A. As a result of this, the execution code shown in FIG. 25B is generated and included in the output program 28.

Lastly, with reference to FIGS. 26 to 29, a description will be given of an example in which the opportunity for a different optimization is broadened because of the optimization of an assignment instruction.

Figure 26:
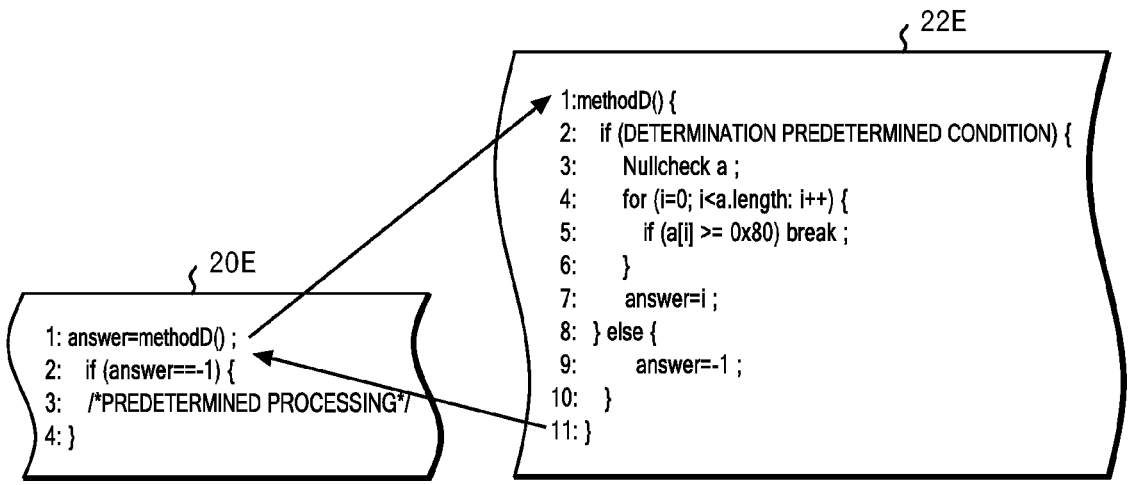
FIG. 26 shows specific examples of an input program 20E and a library program 22E according to the embodiment.

FIG. 26 shows specific examples of the input program 20E and the library program 22E according to the present embodiment. As shown in the input program 20E, methodD is called, and then, the return value of methodD is stored in the variable answer. Then, the value of the variable answer is compared with a constant −1. In a case where the value of the variable answer is equal to constant −1, predetermined processing is executed.

The library program 22E shows the definition of methodD. As shown in lines 2 to 8, in a case where a predetermined condition is satisfied, an element having an element value equal to 0x80 is searched for from an array variable a. Then, a numeric value indicating the position of the element in the array variable is assigned to the variable answer in this case. On the other hand, in a case where the aforementioned predetermined condition is not true, the numeric value −1 is assigned to the variable answer.

The pre-optimization unit 100 generates an intermediate program 24E by performing inline expansion for this methodD.

Figure 27:
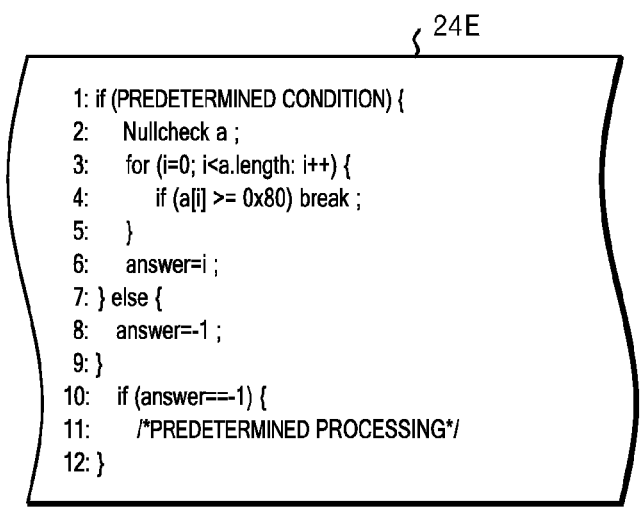
FIG. 27 shows a specific example of an intermediate program 24E according to the embodiment.

FIG. 27 shows a specific example of the intermediate program 24E according to the present embodiment. In lines 1 to 9, each instruction within methodD is expanded without being modified except for an instruction to return a return value. With reference to line 6, the variable i is assigned to the variable answer. Then, the range of a value that the variable i can take is not less than 0 as a result of the processing in line 3 and the like.

With reference to line 10, as to the conditional branch instruction based on the value of the variable answer, the subrange of the variable in the first branch destination includes only −1, and the subrange of the variable in the second branch destination includes values other than −1. Accordingly, the subrange of the variable in the second branch destination includes the subrange of the variable in accordance with the assignment instruction in line 6. For this reason, the assignment instruction in line 6 is replaced with an instruction to assign a constant value to the variable.

FIG. 28 shows a specific example of the intermediate program 26E according to the present embodiment. By the replacement processing, a constant value 0 is assigned to the variable answer as shown in line 6. Here, the variable i is referenced only in lines 3 to 5, and is not referenced at all in the processing thereafter. Accordingly, it can be found that the arithmetic operations, themselves, for the variable i become unnecessary.

FIG. 29 shows a specific example of the intermediate program 26F according to the present embodiment. Because of the aforementioned processing, the arithmetic operations in lines 3 to 4 themselves for the variable i become unnecessary, and are consequently deleted. Since such deletion processing for generating a value of an unused variable is known, in the applicable technical field, as the array bound check elimination technique, and dead store elimination (DSE) or dead code elimination (DCE), the description thereof is omitted here.

As has been described with reference to FIGS. 26 to 29, the optimization of an assignment instruction not only omits a single piece of arithmetic processing, but also promotes various optimizations by removing disincentive of other optimizations, and thereby, significantly improves the execution efficiency of the program. If the value of a variable to be kept updated by loop processing can be changed to a constant, for example, the promotion of parallelization such as vectorization of loop processing can be expected. Actually, according to a measurement performed by the inventors of the present application and the like, a significant improvement in processing speed was achieved by the optimization of a practical program.

Figure 30:
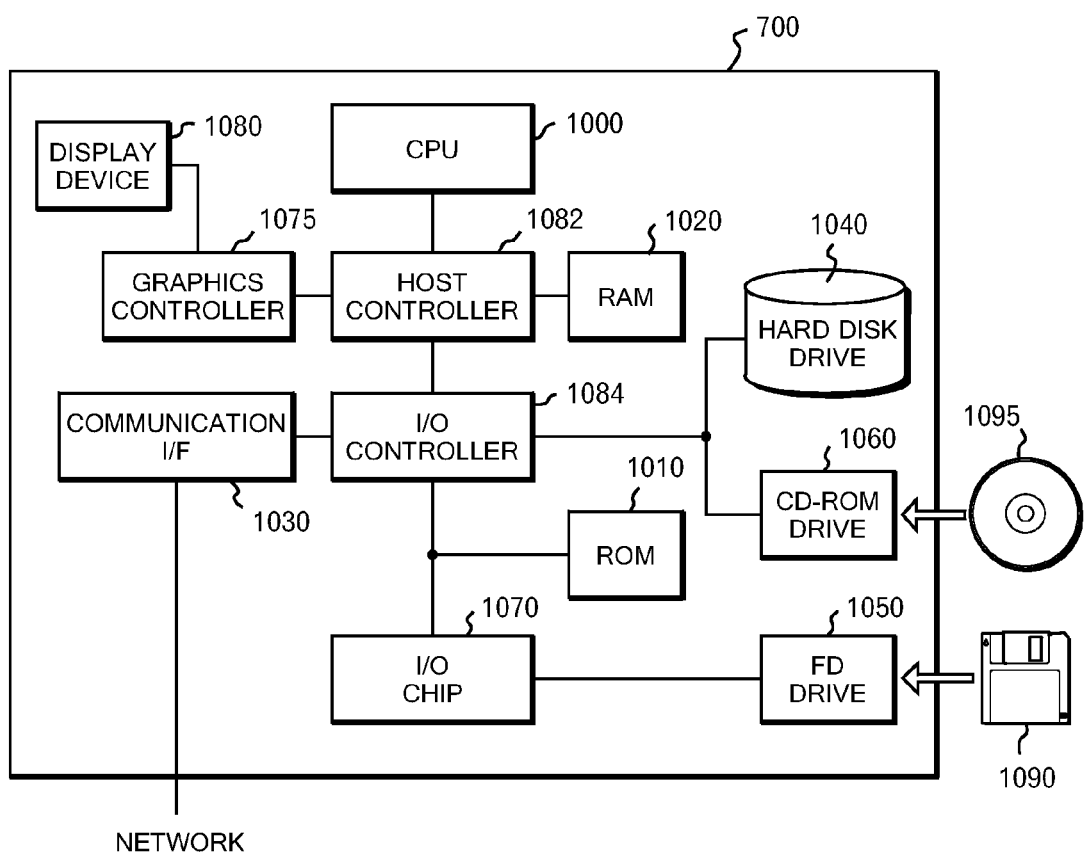
FIG. 30 shows an example of a hardware configuration of a computer 700, which functions as the compiler apparatus 10 according to the embodiment.

FIG. 30 shows an example of a hardware configuration of a computer 700 functioning as the compiler apparatus 10 according to this embodiment. The computer 700 includes a CPU peripheral unit, an input/output unit and a legacy input/output unit. The CPU peripheral unit includes a CPU 1000, a RAM 1020 and a graphics controller 1075, all of which are connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes a ROM 1010, a flexible disk drive 1050 and an input/output chip 1070, all of which are connected to the input/output controller 1084.

The host controller 1082 connects the RAM 1020 to the CPU 1000 and the graphics controller 1075, both of which access the RAM 1020 at a high transfer rate. The CPU 1000 operates according to a program stored in the ROM 1010 and the RAM 1020, and controls each of the components. The graphics controller 1075 obtains image data generated, by the CPU 1000 or the like, in a frame buffer provided in the RAM 1020, and causes a display device 1080 to display the obtained image data. Instead, the graphics controller 1075 may internally include a frame buffer in which the image data generated by the CPU 1000 or the like is stored.

The input/output controller 1084 connects the host controller 1082 to the communication interface 1030, the hard disk drive 1040 and the CD-ROM drive 1060, all of which are relatively high-speed input/output devices. The communication interface 1030 communicates with an external device via a network. In the hard disk drive 1040, programs and data to be used by the computer 700 are stored. The CD-ROM drive 1060 reads a program or data from a CD-ROM 1095, and provides the read-out program or data to the RAM 1020 or the hard disk drive 1040.

Moreover, the input/output controller 1084 is connected to the ROM 101 and relatively low-speed input/output devices such as the flexible disk drive 1050 and an input/output chip 1070. The ROM 1010 stores programs such as a boot program executed by the CPU 1000 at a start-up time of the computer 700 and a program depending on hardware of the computer 700. The flexible disk drive 1050 reads a program or data from a flexible disk 1090, and provides the read-out program or data to the RAM 1020 or the hard disk drive 1040 via the input/output chip 1070. The input/output chip 1070 is connected to the flexible disk drive 1050 and various kinds of input/output devices through, for example, a parallel port, a serial port, a keyboard port, a mouse port.

A program to be provided to the computer 700 is provided by a user by being stored in a storage medium such as the flexible disk 1090, the CD-ROM 1095 or an IC card. The program is read from the storage medium via the input/output chip 1070 and/or the input/output controller 1084, and is installed and executed on the computer 700. Since an operation that the program causes the computer 700 or the like to execute is identical to the operation of the compiler apparatus 10 described by referring to FIGS. 1 to 29, the description thereof is omitted here.

The program described above may be stored in an external storage medium. As the storage medium, any one of the following media may be used, in addition to the flexible disk 1090 and the CD-ROM 1095: an optical recording medium such as a DVD or a PD; a magneto-optic recording medium such as an MD; a tape medium; and a semiconductor memory such as an IC card. Alternatively, the program may be provided to the computer 700 via a network, by using, as a recording medium, a storage device such as a hard disk or a RAM provided in a server system connected to a private communication network or the Internet.

Hereinabove, the present invention has been described by using the embodiment. The technical scope of the present invention, however, is not limited to the scope described in the above-described embodiment. It is obvious to one skilled in the art that various modifications and improvements may be made to the embodiment. For example, in this embodiment, the optimization target was a program to which a technique such as inline expansion is applied. The optimization target, however, may be a program to which a technique such as inline expansion is not applied. In this case, the same effects and advantages as those of the present embodiment can be obtained by specializing (cloning) methods by causing information indicating the subrange of the variable to be propagated between the methods. Moreover, in the present embodiment, the optimization target is a program before the execution code is generated, and an instruction to assign a value to a variable in the program. The optimization target is not limited to this, however. In a case where the optimization target is an execution code, for example, the variable is considered to be a specific area in the memory, and the optimization may be performed by considering an assignment instruction to be a store instruction to the specific area. It is obvious from the description in the scope of the present invention that thus modified and improved embodiments are also included in the technical scope of the present invention.

Although the preferred embodiment of the present invention has been described in detail, it should be understood that various changes, substitutions and alternations can be made therein without departing from spirit and scope of the inventions as defined by the appended claims.

What is claimed is:

1. A compiling method executed by a processor for optimizing a program by use of a computer, the method comprising the steps of:
   analyzing, for an instruction to assign a value to a variable in the program, a range of the value being assignable to the variable by the instruction, as a subrange of the variable if the instruction is executed;
   determining, on the basis of the analyzed subrange of the variable, if the execution result of the program changes with an assignment, by the instruction,
   replacing, under the condition that the determination made by the determination unit is true, the instruction to assign a value to the variable with an instruction to assign a constant value in the subrange of the variable to the variable;
   providing a storage unit for storing the program therein, wherein
   the analyzing comprises accessing the storage unit and scanning the program, the subrange of the variable, and further analyzes, for each instruction referencing the variable in the program, a subrange of the variable in a case where the instruction is executed,
   the determining comprises determining if a subrange of the variable for a certain instruction to assign a value to the variable: is included in a subrange of the variable for a certain instruction that branches on the basis of the assigned value of the variable; and does not overlap with any subrange of the variable respectively for the other instructions each referencing to the variable, and,
   under the condition that the determination made by the determination unit is true, the replacing comprises changing the program by accessing the storage unit and then replacing the instruction to assign a value to the variable with an instruction to assign, to the variable, a constant value selected from the subrange of the variable for the instruction to assign the value to the variable.

2. A compiler apparatus having a processor that optimizes a program, the compiler apparatus comprising:
   a subrange analysis unit configured to analyze, for an instruction to assign a value to a variable in the program, a range of the value being assignable to the variable by the instruction, as a subrange of the variable if the instruction is executed;
   a determination unit configured to determine, according to the analyzed subrange of the variable, if the execution result of the program changes with an assignment, by the instruction, of any value within the subrange of the variable to the variable;
   a replacement unit configured to replace, under the condition that the determination made by the determination unit is true, the instruction to assign a value to the variable with an instruction to assign a constant value in the subrange of the variable to the variable; and
   a storage unit for storing the program therein,
   wherein
   the subrange analysis unit analyzes, by accessing the storage unit and scanning the program, the subrange of the variable, and further analyzes, for each instruction referencing the variable in the program, a subrange of the variable in a case where the instruction is executed,
   the determination unit determines if a subrange of the variable for a certain instruction to assign a value to the variable: is included in a subrange of the variable for a certain instruction that conditionally branches on the basis of the assigned value of the variable; and does not overlap with any subrange of the variable respectively for the other instructions each referencing to the variable, and,
   under the condition that the determination made by the determination unit is true, the replacement unit changes the program by accessing the storage unit and then replacing the instruction to assign a value to the variable with an instruction to assign, to the variable, a constant value selected from the subrange of the variable for the instruction to assign the value to the variable.

3. The compiler apparatus according to claim 2, wherein, for an instruction that conditionally branches on the basis of the value of the variable, the subrange analysis unit analyzes subranges of the variable respectively in branch destinations in association with the corresponding branch destinations resulting from the conditional branch, and
   the determination unit determines if the subrange of the variable for the certain instruction to assign a value to the variable: is included in the subrange of the variable in one of the branch destinations for the certain instruction that conditionally branches on the basis of the value of the variable; and does not overlap with the subrange of the variable in the other one of the branch destinations, and with any of the subranges of the other instructions each referencing to the variable.

4. The compiler apparatus according to claim 3, wherein the subrange analysis unit includes:
a data generation unit configured to generate subrange data, and to cause the storage device to store the subrange data therein, for each instruction referencing to a certain variable in the program, the subrange data including a subrange of the variable immediately before execution of the corresponding instruction, a subrange of the variable immediately after execution of the instruction, and a logical value indicating if the instruction is an instruction to compare the variable with a constant value;
a first data elimination unit configured to access the storage device, and then to eliminate, from the storage device, subrange data including a logical value indicating that the corresponding instruction is one to compare the variable with a constant value, under the conditions that a plurality of pieces of subrange data each including a different logical value are detected, and that the plurality of pieces of subrange data have the same pair of the subrange of the variable immediately before execution of the instruction and the subrange of the variable immediately after execution of the instruction; and
a second data elimination unit configured to access the storage device, and to eliminate first subrange data from the storage device under the conditions that a subrange of the variable immediately after execution of a corresponding instruction, the variable being included in the first subrange data, matches a subrange of the variable immediately before execution of the corresponding instruction, the subrange being included in a second subrange data, and that the logical value included in the first subrange data indicates the corresponding instruction being an instruction to compare the variable with a constant, and
the determination unit reads, by accessing the storage device, certain subrange data including a logical value indicating that the corresponding instruction is one to compare the variable with a constant, and then determines if the subrange of the variable immediately after execution of the instruction, the subrange being included in the certain subrange data, includes the subrange of the variable for the instruction to assign a value to the variable, and if the subrange of the variable immediately after execution of the instruction, the subrange being included in different subrange data, does not overlap with the subrange of the variable for the instruction to assign a value to the variable.

5. The compiler apparatus according to claim 3 further comprising an idiom detection unit configured to detect, by scanning the program, processing for reading a predetermined number of elements from each of a plurality of array variables, for comparing the elements with one another, and then for assigning a difference between the elements to the variable in a case where a different element value is detected while assigning the numeric value 0 in a case where no different element value is detected, wherein,
under the condition that the processing is detected by the idiom detection unit, the determination unit determines if a subrange of the variable in a first branch destination of the certain instruction that conditionally branches on the basis of the value of the variable includes only the numeric value 0, and also if a subrange of the variable in a second branch destination of the instruction includes only values other than 0, and
under the condition that the determination made by the determination unit as to the processing detected by the idiom detection unit is true, the replacement unit replaces the processing detected by the idiom detection unit with processing for reading the predetermined number of elements from each of a plurality of array variables, for comparing the elements with one another, and then for assigning a predetermined constant other than 0 to the variable in a case where a different element value is detected while assigning the numeric value 0 to the variable in a case where no different element is detected.

6. The compiler apparatus according to claim 3 further comprising an idiom detection unit configured to detect, by scanning the program, processing for reading a predetermined number of elements from each of a plurality of array variables, for comparing the elements with one another, and then for assigning a difference between the elements to the variable in a case where a different element value is detected while assigning the numeric value 0 to the variable in a case where no different element value is detected, wherein,
under the condition that the processing is detected by the idiom detection unit, the determination unit determines if a subrange of the variable in a first branch destination of the certain instruction that conditionally branches on the basis of the value of the variable includes only the numeric value 0, if a subrange of the variable in a second branch destination of the instruction includes only a positive number, and if a subrange of the variable in a third branch destination of the instruction includes only a negative number,
under the condition that the determination made by the determination unit as to the processing detected by the idiom detection unit is true, the replacement unit replaces the processing detected by the idiom detection unit with processing for reading the predetermined number of elements from each of the plurality of array variables, for comparing the elements with one another, and then for assigning the numeric value 0 to the variable in a case where no different element value is detected while assigning a predetermined positive constant in a case where an element of one of the array variables is greater than an element of a different one of the array variables, and assigning a predetermined negative constant in a case where the element of the different one of the array variables is greater than the element of the one of the array variables.

7. The compiler apparatus according to claim 5, wherein the processing detected by the idiom detection unit is replaced with processing for storing a processing result in a condition code flag, and
under the condition that the condition code flag is not changed between the processing detected by the idiom detection unit and the instruction that conditionally branches on the basis of the value of the variable, the replacement unit replaces the certain instruction that conditionally branches on the basis of the value of the variable with an instruction that conditionally branches on the basis of the condition code flag.

8. The compiler apparatus according to claim 6, wherein the processing detected by the idiom detection unit is replaced with processing for storing a processing result in a condition code flag, and under the condition that the condition code flag is not changed between the processing detected by the idiom detection unit and the instruction that conditionally branches on the basis of the value of the variable, the replacement unit replaces the certain instruction that conditionally branches on the basis of the value of the variable with an instruction that conditionally branches on the basis of the condition code flag.

9. The compiler apparatus according to claim 2, wherein the replacement unit selects, from the subrange of the variable for the instruction to be replaced, a value in a range of an immediate value that can be loaded in a register by a single instruction in a computer executing an execution code obtained by compiling the program, and then replaces the instruction with an instruction that assigns the selected value to the variable.

10. The compiler apparatus according to claim 2, wherein the replacement unit selects a value having the minimum absolute value from the subrange of the variable for the instruction to be replaced, and then replaces the instruction with an instruction that assigns the selected value to the variable.

11. The compiler apparatus according to claim 2, wherein the replacement unit selects a power-of-two value from the subrange of the variable for the instruction to be replaced, and then replaces the instruction with an instruction that assigns the selected value to the variable.

12. The compiler apparatus according to claim 2, wherein under condition that the determination made by the determination unit is true, the replacement unit replaces the instruction to assign a value to the variable with an instruction to assign a constant value selected from outside the subrange of the variable for the instruction to the variable, and also changes the instruction that conditionally branches in order that the subrange of the variable for the certain instruction that conditionally branches on the basis of the value of the variable can include the selected constant value.

13. The compiler apparatus according to claim 2, wherein, in addition to the variable in the program, for each different variable to which the value of the variable is to be assigned, the subrange analysis unit further analyzes, for each instruction referencing to the different variable, a subrange of the different variable in a case where the corresponding instruction is executed, and the determination unit determines if the subrange of the variable for the certain instruction to assign a value to the variable: is included in the subrange of the variable for a certain instruction that conditionally branches on the basis of any one of the variable and a value of one of the different variables to each of which the value of the variable is to be assigned; and also does not overlap with any the subrange of the different variable respectively for the other instructions each referencing to any one of the variable and the different variables to each of which the value of the variable is to be assigned.

14. A compiler program stored in a computer readable memory causing a computer to function as a processing device comprising:

a subrange analysis unit configured to analyze, for an instruction to assign a value to a variable in the program, a range of the value being assignable to the variable by the instruction, as a subrange of the variable if the instruction is executed;

a determination unit configured to determine, on the basis of the analyzed subrange of the variable, if the execution result of the program changes with an assignment, by the instruction, of any value within the subrange of the variable to the variable;

a replacement unit configured to replace, under the condition that the determination made by the determination unit is true, the instruction to assign a value to the variable with an instruction to assign a constant value in the subrange of the variable to the variable; and a storage unit for storing the program therein, wherein the subrange analysis unit analyzes, by accessing the storage unit and scanning the program, the subrange of the variable, and further analyzes, for each instruction referencing the variable in the program, a subrange of the variable in a case where the instruction is executed, the determination unit determines if a subrange of the variable for a certain instruction to assign a value to the variable: is included in a subrange of the variable for a certain instruction that branches on the basis of the assigned value of the variable; and does not overlap with any subrange of the variable respectively for the other instructions each referencing to the variable, and, under the condition that the determination made by the determination unit is true, the replacement unit changes the program by accessing the storage unit and then replacing the instruction to assign a value to the variable with an instruction to assign, to the variable, a constant value selected from the subrange of the variable for the instruction to assign the value to the variable.

* * * * *